United States Patent
Ellingsen et al.

(10) Patent No.: US 12,123,182 B2
(45) Date of Patent: Oct. 22, 2024

(54) METHOD OF MANUFACTURING A SINK SYSTEM

(71) Applicant: KOHLER CO., Kohler, WI (US)

(72) Inventors: Steven F. Ellingsen, Plymouth, WI (US); Jason R. Miller, Elkhart Lake, WI (US); Paul A. Bonack, Kohler, WI (US); Evan M Grybush, Belgium, WI (US); Timothy R. Schultz, Sheboygan Falls, WV (US); Jared B Dulaney, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 764 days.

(21) Appl. No.: 17/153,514

(22) Filed: Jan. 20, 2021

(65) Prior Publication Data

US 2021/0230852 A1 Jul. 29, 2021

Related U.S. Application Data

(60) Provisional application No. 62/965,534, filed on Jan. 24, 2020.

(51) Int. Cl.
*B23P 15/00* (2006.01)
*B29C 45/14* (2006.01)
(Continued)

(52) U.S. Cl.
CPC .............. *E03C 1/186* (2013.01); *B23P 15/00* (2013.01); *B29C 45/14065* (2013.01);
(Continued)

(58) Field of Classification Search
None
See application file for complete search history.

(56) References Cited

U.S. PATENT DOCUMENTS

| 208,094 A | 9/1878 | Higgins |
| 526,390 A | 9/1894 | Glauber |

(Continued)

FOREIGN PATENT DOCUMENTS

| CN | 1229626 A | 9/1999 |
| CN | 1299430 A | 6/2001 |

(Continued)

OTHER PUBLICATIONS

European Search Report and Written Opinion corresponding to EP Application No. 22152801.1, dated May 10, 2022.

(Continued)

*Primary Examiner* — Sarang Afzali
(74) *Attorney, Agent, or Firm* — Husch Blackwell LLP

(57) ABSTRACT

An assembly process for assembling a basin using a molding tool operable between an open position and a closed position, the molding tool having a female molding insert, a male molding insert, and an insert jig, the female molding insert and the male molding insert cooperating to define a mold cavity when the molding tool is in the closed position, the female molding insert having an aperture, the insert jig having a sleeve and a cylinder, the cylinder repositionable within the sleeve and having an end with an end face and a pin protruding from the end face, includes applying adhesive to the pin. The assembly process also includes aligning the pin with an aperture of a basin rim insert. The assembly process also includes pressing the basin rim insert towards the end face such that the pin is received within the aperture of the basin rim insert.

9 Claims, 15 Drawing Sheets

(51) Int. Cl.
   *E03C 1/186* (2019.01)
   *B29K 705/12* (2006.01)
   *B29L 31/00* (2006.01)

(52) U.S. Cl.
   CPC ............... *B29C 2045/14114* (2013.01); *B29C 2045/14147* (2013.01); *B29K 2705/12* (2013.01); *B29L 2031/7698* (2013.01)

(56) References Cited

U.S. PATENT DOCUMENTS

| | | |
|---|---|---|
| 594,962 A | 12/1897 | McManus |
| 792,498 A | 6/1905 | Carr |
| 832,309 A | 10/1906 | Frey |
| 915,057 A | 3/1909 | Monahan |
| 948,954 A | 2/1910 | Cody |
| 958,857 A | 5/1910 | Dennis |
| 981,448 A | 1/1911 | Matthews |
| 1,006,994 A | 10/1911 | Barnes |
| 1,225,308 A | 5/1917 | Born |
| 1,408,812 A | 3/1922 | Leighton |
| 1,576,607 A | 3/1926 | Hasskarl |
| 1,579,374 A | 4/1926 | Leighton |
| 1,587,693 A | 6/1926 | Beland |
| 1,618,032 A | 2/1927 | Frederic |
| 1,880,733 A | 10/1932 | Bolhuis |
| 1,986,935 A | 1/1935 | Max |
| 2,005,459 A | 6/1935 | Finn |
| 2,045,965 A | 6/1936 | Rosen |
| 2,065,347 A | 12/1936 | Schulse |
| 2,098,374 A | 11/1937 | Bullock |
| 2,131,111 A | 9/1938 | Marsh |
| 2,141,347 A | 12/1938 | Davis |
| 2,194,343 A | 3/1940 | Wexler |
| 2,308,123 A | 1/1943 | Charles |
| 2,309,851 A | 2/1943 | Kuhne |
| 2,341,093 A | 2/1944 | Haberstump |
| 2,367,161 A | 1/1945 | Wild |
| 2,441,752 A | 5/1948 | Campbell |
| 2,457,918 A | 1/1949 | Pierce |
| 2,473,862 A | 6/1949 | Clawsey |
| 2,508,808 A | 5/1950 | Warman |
| 2,510,238 A | 6/1950 | Mau |
| 2,534,793 A | 12/1950 | Eric |
| 2,597,925 A | 5/1952 | Edger |
| 2,668,300 A | 2/1954 | Grill |
| 2,691,237 A | 10/1954 | Heim |
| 2,818,579 A | 1/1958 | Louis |
| 2,825,177 A | 3/1958 | Nordlof |
| 2,853,750 A | 9/1958 | Davies et al. |
| D184,799 S | 4/1959 | Clemens |
| D188,090 S | 6/1960 | Rasmussen |
| 2,977,082 A | 3/1961 | Harris |
| 2,988,755 A | 6/1961 | Roland |
| 3,023,991 A | 3/1962 | Fisher |
| 3,051,160 A | 8/1962 | Nielsen |
| 3,070,812 A | 1/1963 | Skrmetta |
| 3,142,295 A | 7/1964 | Blee |
| 3,169,743 A | 2/1965 | Page, Jr. |
| 3,204,601 A | 9/1965 | Staver |
| 3,289,218 A | 12/1966 | Mehilos |
| 3,289,990 A | 12/1966 | Grantham |
| 3,472,391 A | 10/1969 | Bolognesi |
| 3,502,384 A | 3/1970 | Gipson |
| D217,164 S | 4/1970 | Jarema |
| 3,508,282 A | 4/1970 | Phillips, Jr. |
| D218,330 S | 8/1970 | Hagopian |
| 3,552,705 A | 1/1971 | Caster |
| D222,087 S | 9/1971 | Hagopian |
| 3,625,162 A | 12/1971 | Crew |
| D223,501 S | 4/1972 | Hamburg |
| 3,680,152 A | 8/1972 | Farrell |
| 3,742,965 A | 7/1973 | Hudziak |
| 3,813,706 A | 6/1974 | Williams |
| 3,827,020 A | 7/1974 | Okamoto |
| 4,033,461 A | 7/1977 | Nevai |
| 4,041,964 A | 8/1977 | Shamoon |
| 4,082,391 A | 4/1978 | Turner |
| D249,207 S | 9/1978 | Emmer |
| 4,114,967 A | 9/1978 | Weekly |
| D253,147 S | 10/1979 | Heckler |
| D253,148 S | 10/1979 | Heckler |
| D253,149 S | 10/1979 | Heckler |
| 4,207,975 A | 6/1980 | Arzillo |
| 4,305,166 A | 12/1981 | Rose |
| 4,351,073 A | 9/1982 | Elsas |
| 4,357,957 A | 11/1982 | Bisonaya et al. |
| 4,370,762 A | 2/1983 | Heil |
| 4,387,738 A | 6/1983 | Bisonaya et al. |
| 4,456,021 A | 6/1984 | Leavens |
| 4,458,705 A | 7/1984 | Cawood |
| D277,820 S | 3/1985 | Maayeh |
| 4,531,246 A | 7/1985 | Earley |
| 4,698,861 A | 10/1987 | Bogusz |
| 4,720,879 A | 1/1988 | Rabban |
| 4,884,714 A | 12/1989 | Bechtel |
| 5,012,537 A | 5/1991 | Underwood |
| 5,181,285 A | 1/1993 | Kolada |
| 5,199,119 A | 4/1993 | Weber |
| 5,217,123 A | 6/1993 | Riley et al. |
| 5,232,189 A | 8/1993 | Koch |
| 5,239,711 A | 8/1993 | Tafur |
| 5,253,752 A | 10/1993 | Jang |
| D341,049 S | 11/1993 | Hugh |
| 5,275,363 A | 1/1994 | Dennis |
| 5,279,007 A | 1/1994 | Kolada |
| 5,367,278 A | 11/1994 | Yoshikawa |
| 5,368,268 A | 11/1994 | Jodwischat |
| D353,652 S | 12/1994 | Dannenberg |
| 5,377,941 A | 1/1995 | Har et al. |
| D358,457 S | 5/1995 | Dannenberg |
| 5,417,397 A | 5/1995 | Harnett |
| D365,235 S | 12/1995 | Jodwischat |
| 5,485,859 A | 1/1996 | Johnson et al. |
| 5,485,927 A | 1/1996 | Hubbard |
| D375,219 S | 11/1996 | Selent |
| 5,590,804 A | 1/1997 | Crum et al. |
| 5,642,871 A | 7/1997 | Repert et al. |
| 5,715,547 A | 2/1998 | Becker et al. |
| 5,864,898 A | 2/1999 | Knapp et al. |
| 5,865,325 A | 2/1999 | Comstock |
| 5,940,906 A | 8/1999 | Halloran |
| 5,947,439 A | 9/1999 | Florey |
| D421,490 S | 3/2000 | Talerico |
| 6,062,397 A | 5/2000 | Licari |
| 6,092,772 A | 7/2000 | Garcia et al. |
| 6,154,895 A | 12/2000 | Pisklak |
| 6,212,707 B1 | 4/2001 | Thompson et al. |
| 6,216,992 B1 | 4/2001 | Bisonaya et al. |
| 6,223,362 B1 | 5/2001 | Liang |
| D444,216 S | 6/2001 | Katz et al. |
| D444,548 S | 7/2001 | Katz et al. |
| D444,549 S | 7/2001 | Katz et al. |
| 6,276,675 B1 | 8/2001 | Shamoon |
| D451,585 S | 12/2001 | Svendsen et al. |
| 6,330,948 B1 | 12/2001 | Leto |
| 6,338,171 B1 | 1/2002 | Dandridge |
| 6,341,704 B1 | 1/2002 | Michel, Jr. |
| 6,341,770 B1 | 1/2002 | Landherr |
| 6,349,429 B1 | 2/2002 | Zurba et al. |
| D458,493 S | 6/2002 | Cascio |
| D458,494 S | 6/2002 | Cascio |
| 6,446,280 B1 | 9/2002 | Moore, Jr. |
| 6,517,757 B1 * | 2/2003 | Anneken ............. B29C 45/1459 264/161 |
| D473,294 S | 4/2003 | Genslak et al. |
| 6,543,071 B1 | 4/2003 | Lenner |
| 6,557,956 B2 | 5/2003 | Hightower |
| 6,564,398 B1 | 5/2003 | Trott |
| D477,949 S | 8/2003 | Cascio et al. |
| D477,950 S | 8/2003 | Cascio et al. |
| D478,444 S | 8/2003 | Cascio et al. |
| 6,619,604 B1 | 9/2003 | Stillman |
| 6,658,677 B2 | 12/2003 | Paul |

(56) References Cited

U.S. PATENT DOCUMENTS

| | | |
|---|---|---|
| D484,956 S | 1/2004 | Rachiele |
| D492,983 S | 7/2004 | Rachiele |
| D494,257 S | 8/2004 | Moran et al. |
| D494,665 S | 8/2004 | Herbeau |
| 6,793,190 B2 | 9/2004 | White |
| 6,793,193 B2 | 9/2004 | De Groote |
| 6,808,147 B2 | 10/2004 | Brannen et al. |
| D498,291 S | 11/2004 | Bayer |
| D499,468 S | 12/2004 | Trepanier |
| D499,799 S | 12/2004 | Trepanier |
| D499,800 S | 12/2004 | Trepanier |
| D501,041 S | 1/2005 | Moran et al. |
| D501,541 S | 2/2005 | Gordon |
| 6,857,616 B1 | 2/2005 | Gasperi et al. |
| 6,910,604 B2 | 6/2005 | Gugliotti et al. |
| D507,041 S | 7/2005 | Douglass et al. |
| D508,984 S | 8/2005 | Gordon |
| 6,929,232 B1 | 8/2005 | Gasperi et al. |
| 6,991,200 B2 | 1/2006 | Stillman |
| D518,560 S | 4/2006 | Arkay-Leliever |
| D520,611 S | 5/2006 | Wozniczka et al. |
| D520,612 S | 5/2006 | Wozniczka et al. |
| 7,039,963 B2 | 5/2006 | Loberger et al. |
| D525,689 S | 7/2006 | Wozniczka et al. |
| 7,086,099 B2 | 8/2006 | Rocci |
| D527,808 S | 9/2006 | Wozniczka et al. |
| D529,148 S | 9/2006 | Douglass |
| D529,999 S | 10/2006 | Lonneman et al. |
| D530,001 S | 10/2006 | Lonneman et al. |
| D530,403 S | 10/2006 | Lonneman et al. |
| D530,404 S | 10/2006 | Lonneman et al. |
| D530,405 S | 10/2006 | Douglass et al. |
| D530,797 S | 10/2006 | Lonneman |
| D537,149 S | 2/2007 | Douglass et al. |
| 7,178,886 B2 | 2/2007 | Hightower |
| D537,997 S | 3/2007 | Plikuhn |
| D538,497 S | 3/2007 | Plikuhn |
| D539,396 S | 3/2007 | Plikuhn et al. |
| D544,074 S | 6/2007 | Douglass et al. |
| D545,408 S | 6/2007 | Plikuhn |
| D545,409 S | 6/2007 | Plikuhn |
| D546,426 S | 7/2007 | Plikuhn |
| D546,929 S | 7/2007 | Schneider et al. |
| D547,838 S | 7/2007 | Plikuhn |
| 7,246,387 B2 | 7/2007 | Erickson et al. |
| D548,311 S | 8/2007 | Mahon |
| D551,742 S | 9/2007 | Plikuhn |
| D552,222 S | 10/2007 | Tortorello |
| 7,278,175 B2 | 10/2007 | Torres |
| D556,297 S | 11/2007 | Baade et al. |
| D556,848 S | 12/2007 | Ruggiero et al. |
| D556,868 S | 12/2007 | Tortorello |
| D558,311 S | 12/2007 | Adams |
| 7,305,723 B2 | 12/2007 | Fulks |
| D559,366 S | 1/2008 | Chong |
| 7,377,661 B2 | 5/2008 | Douglass |
| D573,701 S | 7/2008 | Rachiele |
| 7,424,949 B2 | 9/2008 | Kumar |
| D585,126 S | 1/2009 | Eilmus et al. |
| 7,481,473 B1 | 1/2009 | Warning |
| D587,789 S | 3/2009 | Drake |
| D587,790 S | 3/2009 | Tortorello et al. |
| D588,677 S | 3/2009 | Drake |
| D588,678 S | 3/2009 | Chong et al. |
| D588,679 S | 3/2009 | Cheng |
| D588,680 S | 3/2009 | Cheng |
| D588,685 S | 3/2009 | Chong |
| D589,222 S | 3/2009 | Gicela et al. |
| 7,503,534 B2 | 3/2009 | Pollack |
| 7,568,239 B2 | 8/2009 | Spruner Von Mertz et al. |
| 7,578,399 B1 | 8/2009 | Mulaw |
| D600,334 S | 9/2009 | Chong |
| 7,594,706 B2 | 9/2009 | Styka et al. |
| D603,026 S | 10/2009 | Deboer et al. |
| D603,027 S | 10/2009 | Deboer et al. |
| D603,029 S | 10/2009 | Bucher |
| D603,334 S | 11/2009 | Suzuki |
| D603,486 S | 11/2009 | Mayer et al. |
| 7,699,277 B2 | 4/2010 | Bagnall |
| 7,721,362 B2 | 5/2010 | Martin et al. |
| 7,726,521 B2 | 6/2010 | Bassett et al. |
| 7,731,846 B1 | 6/2010 | Jones |
| 7,735,661 B1 | 6/2010 | Sumner et al. |
| D624,635 S | 9/2010 | Eckhaus |
| D627,449 S | 11/2010 | Eckhaus |
| 7,841,473 B2 | 11/2010 | Huang et al. |
| 7,854,030 B2 | 12/2010 | Lee et al. |
| D636,138 S | 4/2011 | Talerico |
| 8,070,148 B2 | 12/2011 | Nishida |
| D651,699 S | 1/2012 | Booth et al. |
| 8,088,468 B2 | 1/2012 | Maggio |
| 8,096,678 B2 | 1/2012 | Jones et al. |
| D655,798 S | 3/2012 | Miller et al. |
| D657,028 S | 4/2012 | Eilmus |
| 8,185,980 B2 | 5/2012 | Adams et al. |
| D662,574 S | 6/2012 | Booth et al. |
| D663,389 S | 7/2012 | Miller et al. |
| D663,395 S | 7/2012 | Miller et al. |
| 8,214,939 B2 | 7/2012 | Spurlock |
| 8,296,876 B2 | 10/2012 | Yang et al. |
| D670,364 S | 11/2012 | Miller et al. |
| D670,366 S | 11/2012 | Booth et al. |
| D670,367 S | 11/2012 | Miller et al. |
| D671,197 S | 11/2012 | Miller et al. |
| D675,300 S | 1/2013 | Miller et al. |
| 8,393,022 B2 | 3/2013 | Dachowski |
| D682,998 S | 5/2013 | Eilmus |
| D685,456 S | 7/2013 | Eckhaus |
| D685,457 S | 7/2013 | Eckhaus |
| 8,484,916 B2 | 7/2013 | Farag |
| 8,511,762 B2 | 8/2013 | Stegerwald |
| D698,905 S | 2/2014 | Ziemann et al. |
| D699,012 S | 2/2014 | Ziemann et al. |
| D699,013 S | 2/2014 | Ziemann et al. |
| D699,330 S | 2/2014 | Ziemann et al. |
| D700,301 S | 2/2014 | Rachiele |
| 8,684,192 B1 | 4/2014 | Margolin |
| 8,801,926 B2 | 8/2014 | Housley |
| 8,844,070 B2 | 9/2014 | Booth et al. |
| 8,870,306 B2 | 10/2014 | Simon |
| 8,925,124 B2 | 1/2015 | Littlehorn, Sr. |
| D722,145 S | 2/2015 | Morales et al. |
| D725,757 S | 3/2015 | Morales et al. |
| 9,032,567 B1 | 5/2015 | Galgano |
| 9,066,631 B2 | 6/2015 | Didehvar et al. |
| 9,073,096 B2 | 7/2015 | Ehman |
| 9,085,884 B2 | 7/2015 | Lopchinsky |
| 9,115,484 B2 | 8/2015 | Fulford et al. |
| 9,173,487 B2 | 11/2015 | Booth et al. |
| 9,226,621 B1 | 1/2016 | Jones et al. |
| 9,228,331 B1 | 1/2016 | Weinstein |
| 9,238,907 B2 | 1/2016 | Murray |
| 9,260,845 B1 | 2/2016 | Siegel |
| 9,291,301 B2 | 3/2016 | Brinkmann |
| 9,380,917 B2 | 7/2016 | Eilmus et al. |
| 9,414,717 B2 | 8/2016 | Tollasepp et al. |
| 9,416,538 B2 | 8/2016 | Torres et al. |
| 9,427,135 B2 | 8/2016 | Audet et al. |
| 9,567,735 B2 | 2/2017 | Siegel |
| 9,574,333 B2 | 2/2017 | O'Brien et al. |
| 9,622,621 B2 | 4/2017 | Brinkmann |
| 9,708,064 B2 | 7/2017 | Vandewall et al. |
| 9,750,375 B2 | 9/2017 | Byun |
| D799,648 S | 10/2017 | Chong |
| D799,649 S | 10/2017 | Chong |
| 9,775,470 B2 | 10/2017 | Eilmus et al. |
| 9,783,967 B2 | 10/2017 | Jain et al. |
| 9,790,671 B2 | 10/2017 | Jones et al. |
| 9,808,123 B1 | 11/2017 | Brinkmann |
| D804,620 S | 12/2017 | Palazzolo et al. |
| D816,197 S | 4/2018 | Chong et al. |
| 9,930,998 B2 | 4/2018 | Palazzolo et al. |
| D821,670 S | 6/2018 | Lynch |
| D824,628 S | 7/2018 | Lynch |

(56) References Cited

U.S. PATENT DOCUMENTS

| | | | |
|---|---|---|---|
| 10,092,097 B2 | 10/2018 | Booth et al. | |
| 10,151,085 B2 | 12/2018 | Chong et al. | |
| D845,451 S | 4/2019 | Swilley | |
| D861,837 S | 10/2019 | Chong et al. | |
| D865,138 S | 10/2019 | Lyons | |
| 10,501,919 B2 | 12/2019 | Chong et al. | |
| D872,243 S | 1/2020 | Wegner et al. | |
| D886,255 S | 6/2020 | Wegner et al. | |
| D911,497 S | 2/2021 | Levi | |
| 11,149,421 B2 * | 10/2021 | Liang | E03C 1/18 |
| 2004/0016052 A1 | 1/2004 | Domenig | |
| 2005/0044625 A1 | 3/2005 | Kommers | |
| 2005/0155147 A1 | 7/2005 | Trepanier et al. | |
| 2005/0223486 A1 | 10/2005 | Jumalon | |
| 2007/0157378 A1 | 7/2007 | Kendall et al. | |
| 2009/0094741 A1 | 4/2009 | Valadez et al. | |
| 2009/0139023 A1 | 6/2009 | Talerico | |
| 2009/0172876 A1 | 7/2009 | Hendrickson et al. | |
| 2009/0314730 A1 | 12/2009 | Mansikkamaa | |
| 2010/0072147 A1 | 3/2010 | Reenberg et al. | |
| 2010/0116955 A1 | 5/2010 | Hayes et al. | |
| 2010/0148896 A1 | 6/2010 | Hugo | |
| 2010/0213145 A1 | 8/2010 | Swank | |
| 2010/0254125 A1 | 10/2010 | Jones et al. | |
| 2010/0275367 A1 | 11/2010 | Bager et al. | |
| 2010/0275368 A1 | 11/2010 | Miller et al. | |
| 2010/0275369 A1 | 11/2010 | Eilmus et al. | |
| 2011/0056016 A1 | 3/2011 | Mun | |
| 2011/0101199 A1 | 5/2011 | Andrade | |
| 2011/0163510 A1 | 7/2011 | Wedi | |
| 2011/0219535 A1 | 9/2011 | Bouroullec et al. | |
| 2011/0303626 A1 | 12/2011 | Roenne | |
| 2012/0169192 A1 | 7/2012 | Simon | |
| 2012/0222211 A1 | 9/2012 | Booth et al. | |
| 2012/0240330 A1 | 9/2012 | Fulford et al. | |
| 2013/0337220 A1 | 12/2013 | Janke | |
| 2014/0041113 A1 | 2/2014 | Mobbs | |
| 2014/0245533 A1 | 9/2014 | Lee et al. | |
| 2014/0259381 A1 | 9/2014 | Fogerlie | |
| 2014/0346102 A1 | 11/2014 | Housley | |
| 2014/0366263 A1 | 12/2014 | Thompson et al. | |
| 2015/0122961 A1 | 5/2015 | Batiste et al. | |
| 2015/0128339 A1 | 5/2015 | Warner | |
| 2015/0230667 A1 | 8/2015 | Palazzolo et al. | |
| 2015/0284937 A1 | 10/2015 | Baier et al. | |
| 2016/0045027 A1 | 2/2016 | Alkoby | |
| 2016/0215484 A1 | 7/2016 | Williams | |
| 2016/0235201 A1 | 8/2016 | Soot | |
| 2016/0256804 A1 | 9/2016 | Medeiros | |
| 2017/0027387 A1 | 2/2017 | Lakshmi Narasimhan | |
| 2017/0130433 A1 | 5/2017 | Franco | |
| 2017/0172379 A1 | 6/2017 | Keller et al. | |
| 2017/0245693 A1 | 8/2017 | Palazzolo et al. | |
| 2017/0295960 A1 | 10/2017 | Allen | |
| 2018/0030702 A1 | 2/2018 | Childs et al. | |
| 2018/0030703 A1 | 2/2018 | Cagliari et al. | |
| 2018/0030704 A1 | 2/2018 | Bomatter et al. | |
| 2018/0030705 A1 | 2/2018 | Bomatter et al. | |
| 2018/0125305 A1 | 5/2018 | Richards | |
| 2018/0187400 A1 | 7/2018 | Chong et al. | |
| 2018/0187401 A1 | 7/2018 | Chong et al. | |
| 2018/0187403 A1 | 7/2018 | Chong et al. | |
| 2020/0063412 A1 | 2/2020 | Miller et al. | |
| 2020/0352331 A1 | 11/2020 | Graf | |

FOREIGN PATENT DOCUMENTS

| | | |
|---|---|---|
| CN | 1757837 A | 4/2006 |
| CN | 1938495 A | 3/2007 |
| CN | 102105642 A | 6/2011 |
| CN | 102791919 A | 11/2012 |
| CN | 104912281 A | 9/2015 |
| CN | 105496036 A | 4/2016 |
| CN | 205242533 U | 5/2016 |
| CN | 105908812 A | 8/2016 |
| CN | 207285669 | 5/2018 |
| CN | 108567358 A | 9/2018 |
| CN | 209653051 U | 11/2019 |
| DE | 26 58 193 B1 | 7/1978 |
| DE | 39 28 806 A1 | 11/1990 |
| EP | 0 534 517 A1 | 3/1993 |
| EP | 0 968 078 | 1/2000 |
| EP | 1 442 691 A1 | 8/2004 |
| EP | 2 168 750 A1 | 3/2010 |
| EP | 2 194 196 A2 | 6/2010 |
| EP | 2 803 772 A2 | 11/2014 |
| EP | 3 670 768 A1 | 6/2020 |
| ES | 2301357 A1 | 6/2008 |
| FR | 2887416 B1 | 11/2008 |
| GB | 2 214 127 A | 8/1989 |
| JP | S5555842 A | 4/1980 |
| JP | 937863 A | 2/1997 |
| JP | H119487 A | 1/1999 |
| JP | H119488 A | 1/1999 |
| JP | H11-346951 A | 12/1999 |
| JP | 5088124 B2 | 12/2012 |
| JP | 2017127378 A | 7/2017 |
| WO | WO-2012/069682 A1 | 5/2012 |
| WO | WO-2012/134118 A2 | 10/2012 |
| WO | WO-2016/062519 A1 | 4/2016 |

OTHER PUBLICATIONS

Blanco America, "Blanco's New One Stainless Steel Sinks," retrieved from https://youtu.be/ITta7oPFXgA, pp. 1-19 (2014). https://youtu.be/ITta7oPFXgA; accessed Jan. 5, 2021.
FIFTV Kitchen & Bath Fixtures from Kraus USA Video Snippets, https://www.youtube.com/watch?v=48iJF4PKAqA, accessed Sep. 14, 2020, pp. 1-16 https://www.youtube.com/watch?v=48iJF4PKAqA; accessed Jan. 5, 2021.
Elite Bath Chameleon Stainless, http://elitebath.com/stainless.html, accessed Apr. 19, 2021, pp. 1-2.
Texas Lightsmith Luminescent Sinks, https://www.texaslightsmith.com/luminescent-sinks/, accessed Apr. 19, 2021, pp. 1-32.
Extended European Search Report on EP Appl. Ser. No. 21180585.8 dated Nov. 9, 2021 (12 pages).
First Indian Examination Report on IN App. Ser. No. 202114003244 dated Jan. 4, 2022 (6 pages).
First Indian Examination Report on IN Appl. Ser. No. 202114003243 dated Jan. 12, 2022 (7 pages).
Office Action for Chinese Application No. 202110089442.2, mailed on Jun. 6, 2022, 11 pages.
Chinese Second Office Action on CN Patent Application No. 201910763481.4 dated Mar. 11, 2021 (7 pages).
Office Action corresponding to CN 202110089442.8 dated Jun. 6, 2022.
English Summary of Office Action corresponding to CN 202110089442.8 dated Jun. 6, 2022.
"Blanco One™ Super Single Bowl," retrieved from https://www.blanco.com/en_us/en_us/sinks/product_catalog/sink.html?SID=BLANCO ONE Super Single Bowl&filter=true, 3 pages (no date).
"ELXUFP3620: Elkay Quartz Luxe 35⅞" x20¹⁵⁄₁₆" x9" Single Bowl Farmhouse Sink with Perfect Drain," retrieved from https://www.elkay.com/products/elxufp3620.html, 2 pages (no date).
Belle Foret. "Apron Front Kitchen Sink". Model No. BFF1KIT. BelleForet.com online catalog. All Contents Copyright, Your Other Warehouse. (1 page).
Bellucci 30" Flat Apron Front Granite Quartz Composite Single Bowl Kitchen Sink in Brown, https://www.kraususa.com/kraus-kgf1-30brown-30-flat-apron-front-granite-quartz-composite-single-bowl-kitchen-sink-in-brown.html, accessed Sep. 14, 2020, pp. 1-4.
Bellucci 30" Flat Apron Front Granite Quartz Composite Single Bowl Kitchen Sink in White, https://www.kraususa.com/kraus-kgf1-30white-30-flat-apron-front-granite-quartz-composite-single-bowl-kitchen-sink-in-white.html, accessed Sep. 14, 2020, pp. 1-4.
Bellucci 30" Flat Apron Granite Quartz Composite Single Bowl Kitchen Sink in Black, https://www.kraususa.com/kraus-kgf1-30black-30-flat-apron-front-granite-quartz-composite-single-bowl-kitchen-sink-in-black.html, accessed Sep. 14, 2020, pp. 1-4.

(56) References Cited

OTHER PUBLICATIONS

Bellucci 33" Flat Apron Front Granite Quartz Composite Single Bowl Kitchen Sink in Black, https://www.kraususa.com/kraus-kgf1-33black-33-flat-apron-front-granite-quartz-composite-single-bowl-kitchen-sink-in-black.html, accessed Sep. 14, 2020, pp. 1-5.
Bellucci 33" Flat Apron Front Granite Quartz Composite Single Bowl Kitchen Sink in Brown, https://www.kraususa.com/kraus-kgf1-33brown-33-flat-apron-front-granite-quartz-composite-single-bowl-kitchen-sink-in-brown.html, accessed Sep. 14, 2020, pp. 1-4.
Bellucci 33" Flat Apron Front Granite Quartz Composite Single Bowl Kitchen Sink in White, Model KGF1-33, https://www.kraususa.com/kraus-kgf1-33white-33-flat-apron-front-granite-quartz-composite-single-bowl-kitchen-sink-in-white.html, accessed Sep. 14, 2020, pp. 1-5.
Bellucci by Kraus—Flat Apron-Front Farmhouse Kitchen Sink Video Snippets, https://www.youtube.com/watch?v=bzwDrUpAPUg, accessed Sep. 14, 2020, pp. 1-7.
Bellucci Workstation 33" Quartz Composite Single Bowl Farmhouse Kitchen Sink in Metallic Brown, https://www.kraususa.com/kraus-kgf2-33mbr-workstation-33-quartz-composite-single-bowl-farmhouse-kitchen-sink-in-metallic-brown.html, accessed Sep. 14, 2020, pp. 1-4.
Bellucci Workstation 33" Quartz Composite Single Bowl Farmhouse Kitchen Sink in Metallic Grey, https://www.kraususa.com/kraus-kgf2-33mgr-workstation-33-quartz-composite-single-bowl-farmhouse-kitchen-sink-in-metallic-grey.html, accessed Sep. 14, 2020, pp. 1-4.
Blanco America, "Blanco's New One Stainless Steel Sinks," retrieved from https://youtu.be/ITta7oPFXgA, pp. 1-19 (2014).
FIFTV Kitchen & Bath Fixtures from Kraus USA Video Snippets, https://www.youtube.com/watch?v=48iJF4PKAqA, accessed Sep. 14, 2020, pp. 1-16.
Foreign Action other than Search Report on CN 201910763481.4 dated Jul. 30, 2020 (11 pages).
Foreign Action other than Search Report on CN 201910763481.4 dated Sep. 16, 2019 [No English translation].
Instawares.com. GSW Stainless Steel Corner Drain Sink Bowl—18.times.24in. Instawares.com online catalog. (1 page).
Kallista. "For Loft by Michael S. Smith Fireclay Kitchen Sink with Drajnboard." Model No. L20300. Kallista.com online catalog. Copyright 2011 Kohler Co. (2 pages).
Kallista. "For Loft by Michael S. Smith Fireclay Kitchen Sink." Model No. L20301. Kallista.com online catalog. Copyright 2011 Kohler Co. (2 pages).
Kallista. "For Town by Michael S. Smith Fireclay Kitchen Sink." Model No. L20303. Kallista.com online catalog. Copyright 2011 Kohler Co. (2 pages).
Kohler Co. "Dickinson Apron-Front, Tile-in Kitchen Sink". Model No. K-6546-3. Kohler Co. online catalog. Copyright 2011 Kohler Co. (3 pages).
Kohler Co. "Dickinson Apron-Front, Tile-in Kitchen Sink". Model No. K-6546-4. Kohler Co. online catalog. Copyright 2011 Kohler Co. (3 pages).
Kohler Co. "Dickinson Apron-Front, Tile-in Kitchen Sink". Model No. K-6546-4U. Kohler Co. online catalog. Copyright 2011 Kohler Co. (3 pages).
Kohler Co. "Hawthorne Apron-Front, Tile-in Kitchen Sink". Model No. K-6534-3. Kohler Co. online catalog. Copyright 2011 Kohler Co.. (3 pages).
Kohler Co. "Hawthorne Apron-Front, Tile-in Kitchen Sink". Model No. K-6534-4. Kohler Co. online catalog. Copyright 2011 Kohler Co. (3 pages).
Kohler Co. "Hawthorne Apron-Front, Tile-in Kitchen Sink". Model No. K-6534-4U. Kohler Co. online catalog. Copyright 2011 Kohler Co. (3 pages).
Kohler Fixtures, Apron Front Sinks, pp. 352-355 (2014).
Kore Workstation 30" Apron Front 16 Guage Stainless Steel Single Bowl Kitchen Sink, https://www.kraususa.com/kraus-kwf410-30-workstation-30-apron-front-16-gauge-stainless-steel-single-bowl-kitchen-sink.html, accessed Sep. 14, 2020, pp. 1-4.
Kraus Bellucci Sink Collection Video Snippets, https://www.youtube.com/watch?v=O_MFn1JLOTg#action=share, accessed Sep. 14, 2020, pp. 1-8.
Kraus Forteza KGF1-33 Farmhouse Apron Kitchen Sink, https://www.wayfair.com/home-improvement/pdp/kraus-forteza-33-l-x-21-w-farmhouseapron-kitchen-sink-kus10133.html?piid=40371630, accessed Sep. 14, 2020, pp. 1-9.
Kraus Installation Guide, "Bellucci Quartz Granite Composite Farmhouse Sink with CeramTek," KGF1-30/KGF1-33, www.kraususa.com, Dec. 3, 2018, pp. 1-15.
Kraus Installation Guide, "Bellucci Quartz Granite Composite Farmhouse Sink," KGF1-30 / KGF1-33, KGF2-30 / KGF2-33, KGF11-30 / KGF11-33, KGF12-30 / KGF12-33, www.kraususa.com, Feb. 19, 2019, pp. 1-15.
Kraus Installation Guide, "Bellucci Quartz Granite Composite Farmhouse Sink," KGF1-30/KGF1-33, KGF2-30/KGF2-33, KGF11-30/KGF11-33, KGF12-30/KGF12-33, www.kraususa.com, Feb. 19, 2019, 1- 15.
Kraus Specification Sheet, "KGF1-33 33 Inch Single Bowl Granite Farmhouse Apron Kitchen Sink," www.kraususa.com, Jun. 10, 2019, 1 page.
Linkasink Farm House Kitchen Sink with Inset Apron Front, C071-30 SS, https://static1.squarespace.com/static/5706844ee707eb7087c2faa7/t/590781fc1e5b6c7f60ac7e2f/1493664254854/c071-30_ss_spec_sheet.pdf, accessed Dec. 15, 2020, pp. 1-3.
Lyons. "Premium 34 .times. 23 Apron Sink". Model No. KSxxAP3. 4. Lyons brochure. (3 pages).
Rachiele; "Patented copper apron tront sink with channel;" http://www.rachiele.com/copper.sub.--apron.sub.--sinks-with-patent.asp; retrieval date: Nov. 30, 2011; 3 pages.
Rohl. Apron Front Sink. (4 pages).
Screen capture from Dawn USA showing HTML coding with product installation manual date. Retrieved from http://dawnusa.net/productsee4. Screen capture from amazon.com showing earliest available date for sink model DAF3320C dated Oct. 16, 2017 (2 pages).
Shaws Original. Apron Sink. (1 page).
Songbath.com. Apron Front Kitchen Sink. Songbath.com online catalog. (1 page).
Standart Pro 33" Flat Apron Front 16 Guage Stainless Steel Single Bowl Kitchen Sink, Model KHF410-33, https://www.kraususa.com/kraus-khf410-33-33-flat-apron-front-16-gauge-stainless-steel-single-bowl-kitchen-sink.html, accessed Sep. 14, 2020, pp. 1-4.
Wobane Under Cabinet Lighting Kit, https://www.amazon.com/Lighting-Flexible-LED-Cupboard-WarmWhite/dp/B07BF5PB4G/ref=pd_bxgy_img_2/130-1786452-9365555?_encoding=UTF8&pd_rd_i=B07BF5PB4G&pd_rd_r=28e0b463-27d9-4394-bb05-97c57e6bfb1c&pd_rd_w=kLfbC&pd_rd_wg=3R6PF&pf_rd_p=4e3f7fc3-00c8-46a6-a4db-8457e6319578&pf_rd_r=0F23CBD7138W0BTR097T&psc=1&refRID=0F23CBD7138W0BTR097T, pp. 1-12, accessed Jun. 18, 2020.
Chinese Office Action on CN Appl. Ser. No. 201910763481.4 dated Jul. 30, 2020 (11 pages).
European Search Report on EP 21153093.6 dated Jun. 9, 2021 (20 pages).
European Search Report on EP 21153120.7 dated Jun. 28, 2021 (9 pages).
Third Chinese Office Action on CN Patent Application No. 201910763481.4 dated Aug. 10, 2021 (9 pages).
Extended European Search Report on EP Appln. Ser. No. 21153093.6 dated Sep. 22, 2021 (16 pages).

\* cited by examiner

METHOD OF MANUFACTURING A SINK SYSTEM

CROSS-REFERENCE TO RELATED PATENT APPLICATION

This application claims the benefit of and priority to U.S. Provisional Patent Application No. 62/965,534, filed Jan. 24, 2020, the entire disclosure of which is incorporated herein by reference.

BACKGROUND

The present application relates generally to sink systems, and more particularly to sinks that incorporate various features intended to provide enhanced functionality for such sinks.

SUMMARY

In one embodiment, an assembly process for assembling a basin using a molding tool operable between an open position and a closed position, the molding tool having a female molding insert, a male molding insert, and an insert jig, the female molding insert and the male molding insert cooperating to define a mold cavity when the molding tool is in the closed position, the female molding insert having an aperture, the insert jig having a sleeve and a cylinder, the cylinder repositionable within the sleeve and having an end with an end face and a pin protruding from the end face, includes applying adhesive to the pin. The assembly process also includes aligning the pin with an aperture of a basin rim insert. The assembly process also includes pressing the basin rim insert towards the end face such that the pin is received within the aperture of the basin rim insert. The assembly process also includes filling the mold cavity with molding material such that the molding material encapsulates at least a portion of the basin rim insert, the molding material forming the basin within the mold cavity. The assembly process also includes placing the molding tool in the open position. The assembly process also includes removing the basin from the molding tool after placing the molding tool in the open position, the basin rim insert being at least partially encapsulated by the basin.

In another embodiment, a sink deck assembly includes a basin, a sink deck, and an apron. The basin includes a basin rim having a first aperture. The sink deck includes a second aperture and a third aperture. The sink deck is configured to be coupled to the basin. The apron includes a slot. The apron is configured to be coupled to the sink deck. The basin, the sink deck, and the apron are configured such that the first aperture is aligned with the second aperture when the third aperture is aligned with the slot.

In yet another embodiment, a sink deck assembly includes a sink deck, an apron, and an apron attachment. The sink deck includes a stepped portion and a deck shelf. The deck shelf is contiguous with the stepped portion. The deck shelf has an attachment recess. The apron is coupled to the sink deck. The apron includes an inner recessed portion, an apron shelf, and an outer recessed portion. The inner recessed portion is in confronting relation with the stepped portion. The apron shelf is contiguous with the inner recessed portion and in confronting relation with the deck shelf. The outer recessed portion is contiguous with the apron shelf, separated from the inner recessed portion by the apron shelf, and in confronting relation with the attachment recess. The attachment recess and the outer recessed portion collectively define an apron attachment channel. The apron attachment includes a portion that is received within the apron attachment channel.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
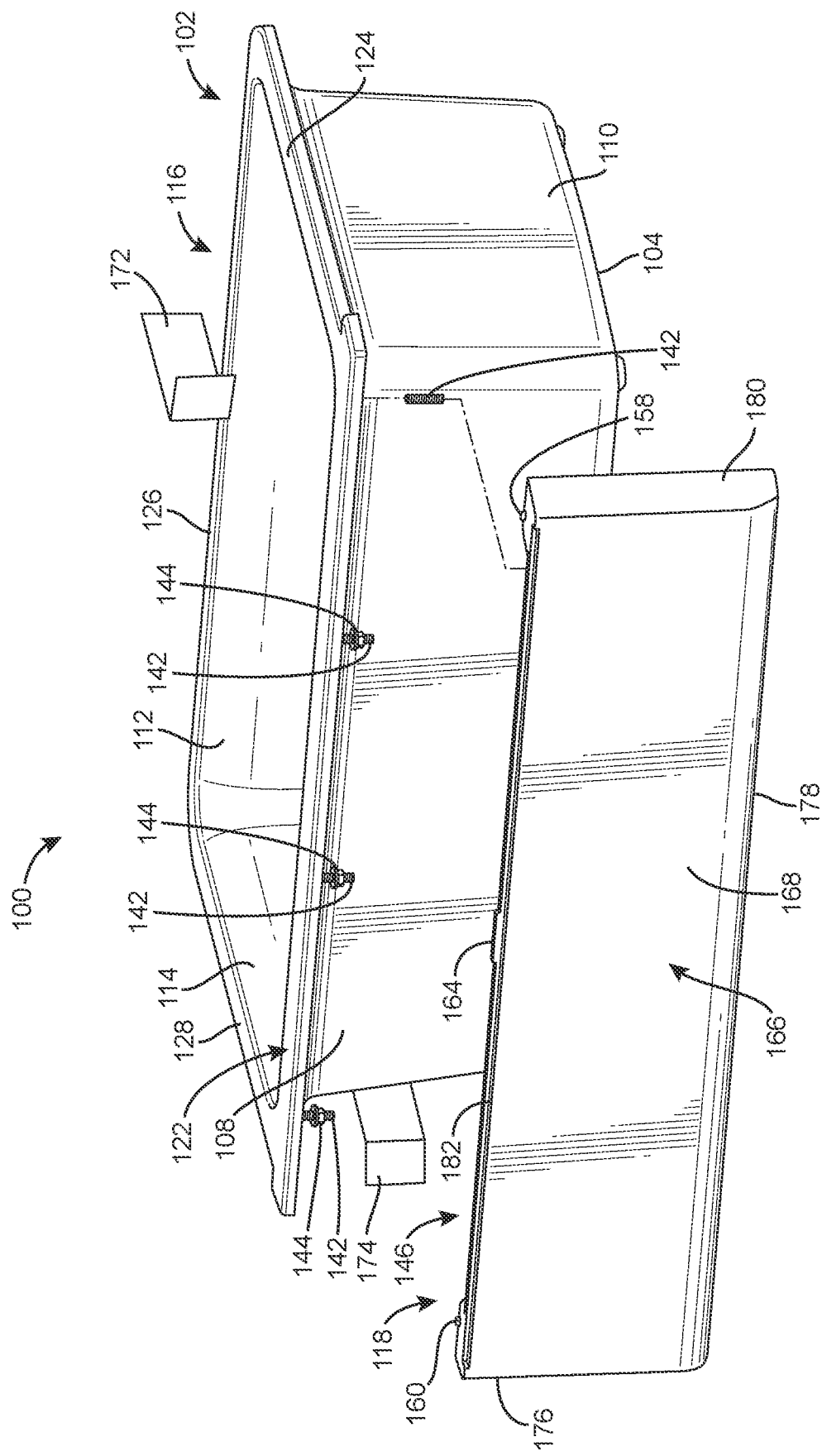
FIG. 1 is a front perspective and exploded view of a sink system according to an example embodiment.

It will be recognized that some or all of the Figures are schematic representations for purposes of illustration. The Figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and for sinks. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Sinks are used frequently in daily life in various environments, such as kitchens, bathrooms, laundry rooms, and the like. Depending on the intended use of the sink, it may be advantageous to utilize various accessories with the sink (e.g., sponges, wash cloths, towels, etc.). In some cases, individuals may utilize auxiliary devices, such as stick-on hooks, soap and brush containers, and removable drain stoppers in order to provide their sink with additional desired functionality. However, these auxiliary devices may have an undesirable appearance or provide an overall cluttered and inelegant look to the sink environment. Furthermore, this undesirable appearance may become increasingly undesirable as use of the auxiliary devices increases become grime and dirt can accumulate on the auxiliary devices.

Implementations described herein are directed to sink systems that provide several functional features without requiring the use of auxiliary devices. As a result, the sink systems described herein may have a superior aesthetic appearance and enhanced functionality as compared to other sinks which do require the use of auxiliary devices.

Some implementations described herein are directed to a sink system that includes a basin and an apron. The basin and apron are attached using threaded fasteners and define an apron attachment channel within which an apron accessory can be received when the apron is coupled to the basin. Advantageously, the apron accessory can be inserted into, removed from, and slid within the apron attachment channel while the apron remains coupled to the basin.

Some implementations described herein are directed to a sink system that includes a basin channel within the basin. The basin channel is configured to facilitate coupling to a basin accessory. As a result, the basin accessory may be supported within the basin and suspended above a floor of the basin, by the basin channel.

Some implementations described herein are directed to an assembly process for a basin. The assembly process utilizes a molding tool with an insert jig that is configured to facilitate at least partial encapsulation of a basin rim insert in molding material that forms the basin. The insert jig may include a pin to which the basin rim insert is adhesively attached prior to the molding tool being filled with molding material.

Some implementations described herein are directed to a sink deck assembly that includes a basin, a sink deck, and an apron. The sink deck is coupled to the basin and the apron. Additionally, the sink deck separates the apron from the basin. As such, the sink deck system may be reconfigured between a variety of configurations, some including the sink deck and others not including the sink deck. As a result, the sink deck assembly facilitates rapid adaptation to a variety of environments such that an aesthetic and/or functional benefit of the sink deck assembly is maximized.

II. Example Sink System

FIGS. 1-8 depict an example sink system 100 (e.g., kitchen sink system, counter sink system, etc.). As is explained in more detail herein, the sink system 100 includes one or more accessories that are configured to augment capabilities of a traditional sink, such that the sink system 100 is more desirable than a traditional sink. The accessories are selectively repositionable within a channel that is defined between a basin of the sink and an apron of the sink. The accessories can be inserted into the channel, repositioned within the channel, and removed from the channel, without the apron being removed from the basin. As a result, the sink system 100 eliminates the need for inelegant attachments to be attached to a sink.

The sink system 100 includes a basin 102. As is explained in more detail herein, the basin 102 is configured to receive water (e.g., hot water, cold water, potable water, cleaning water, etc.), facilitate use of the water within the basin 102, and provide the water from the basin 102. The basin 102 includes a floor 104 that includes a drain 106 formed therein. As is explained in more detail herein, the basin 102 is configured to provide water from a faucet 107 (e.g., kitchen faucet, etc.) to the drain 106, and the drain 106 is configured to pass water from the basin 102. The drain 106 is configured to be coupled to (e.g., attached to, joined with, integrally formed with, etc.) a sink drain conduit (e.g., pipe, fitting, disposal, etc.) and to provide water from the basin 102 to the sink drain conduit.

Figure 2:
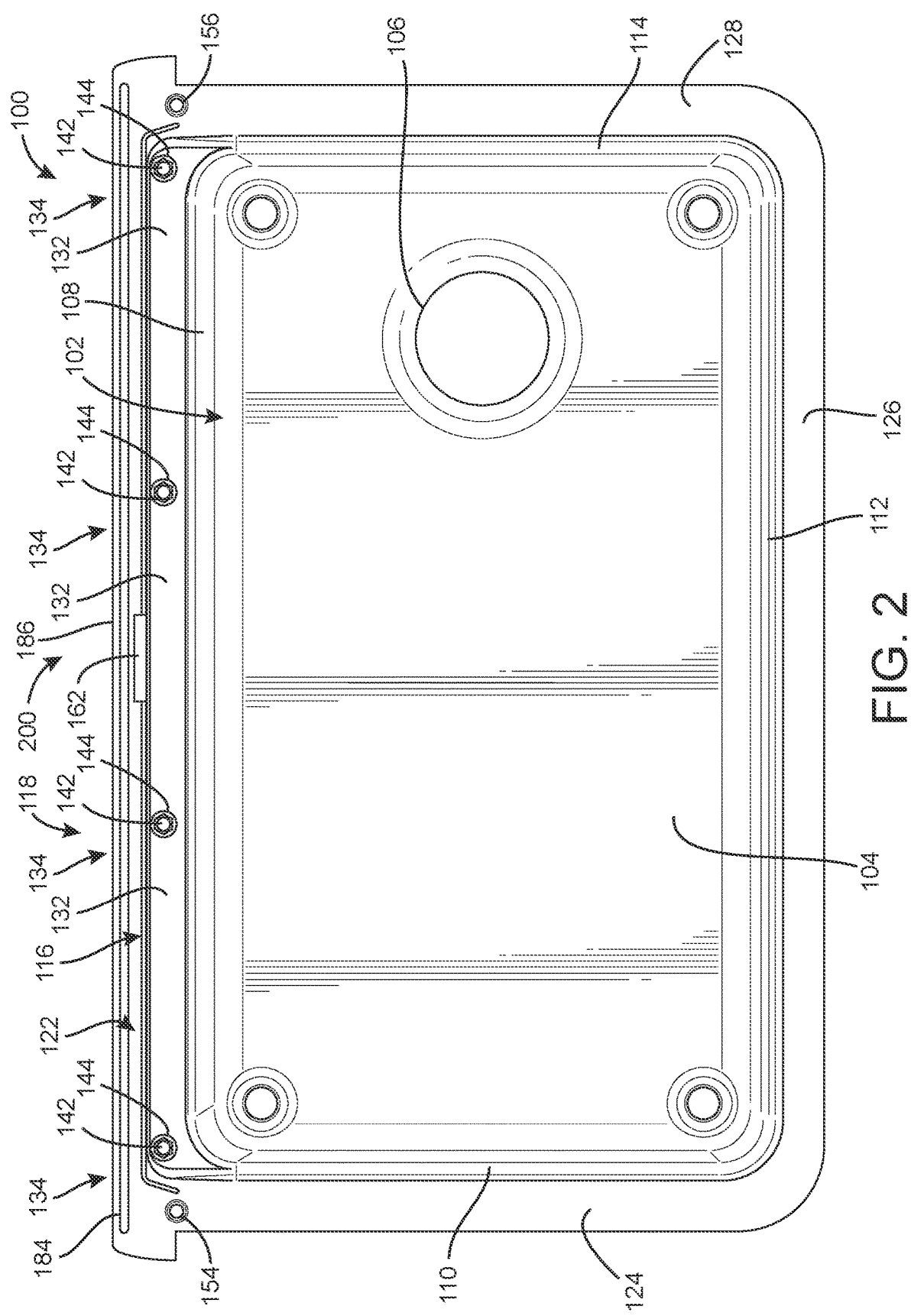
FIG. 2 is a bottom view of a basin for the sink system of FIG. 1.
Figure 3:
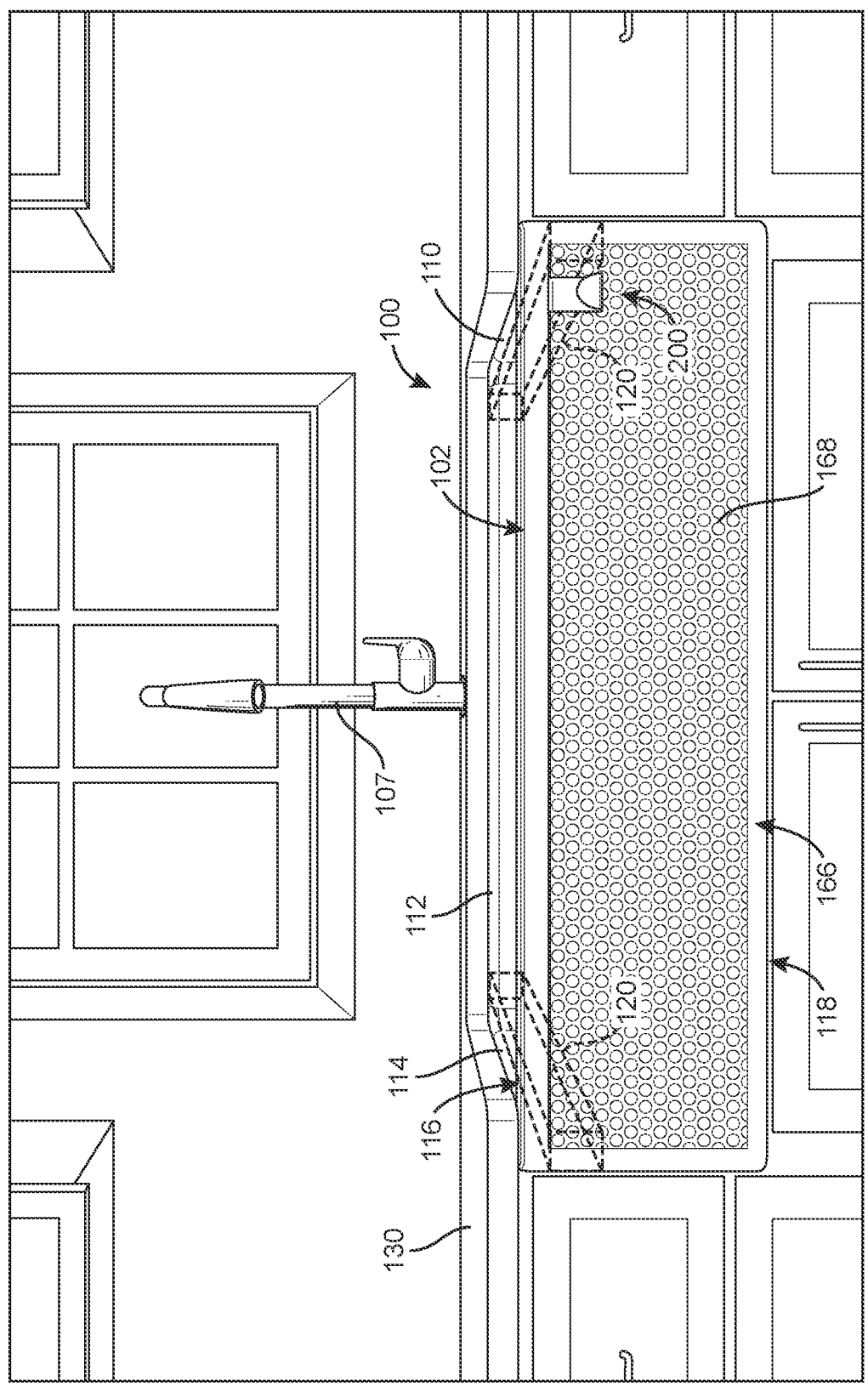
FIG. 3 is a front view of the sink system of FIG. 1 installed in a counter structure.
Figure 4:
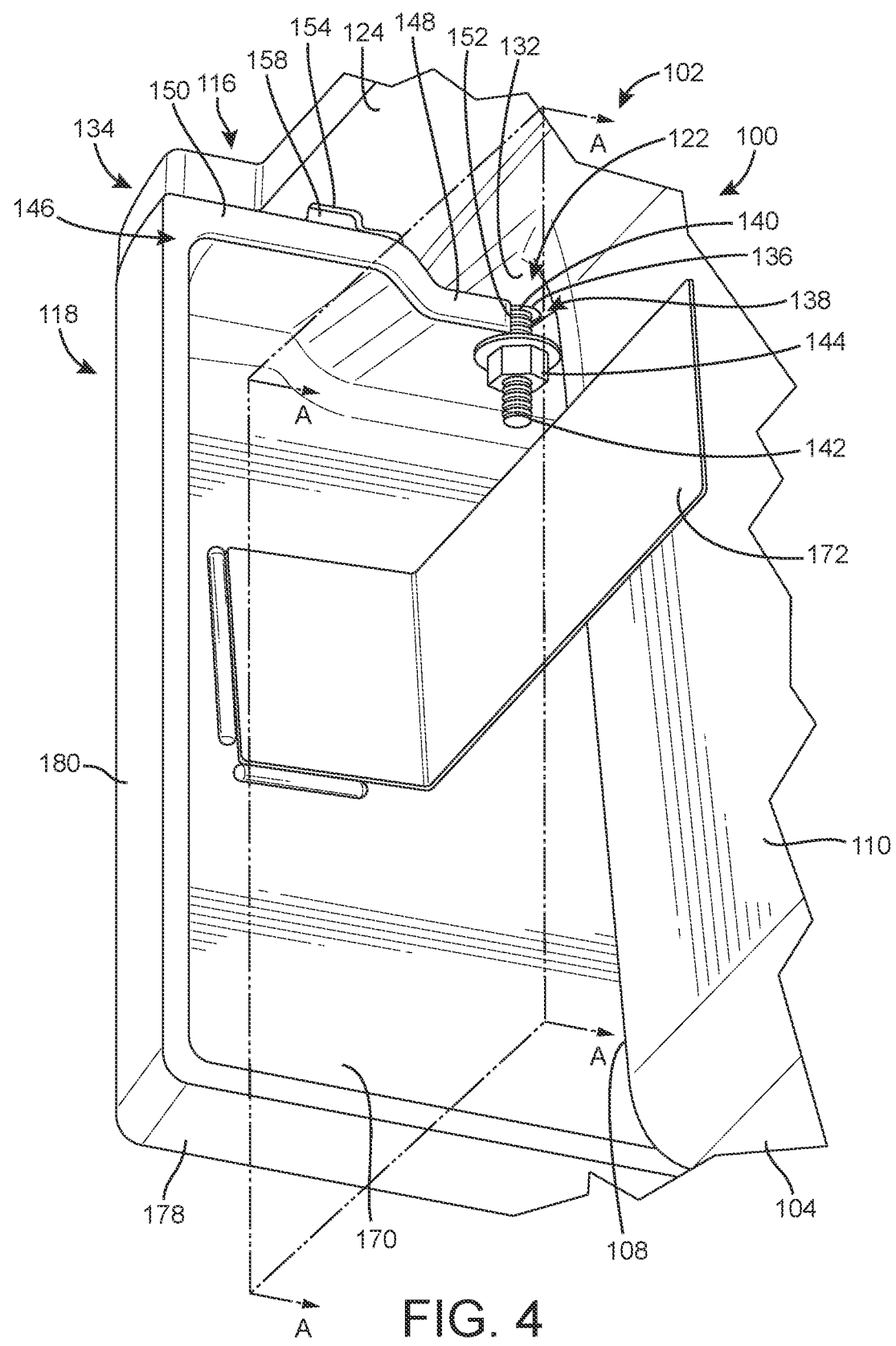
FIG. 4 is a rear perspective view of a portion of the sink system of FIG. 1.

Referring to FIG. 2, the basin 102 also includes a front wall 108. The front wall 108 is contiguous with (e.g., connected to, sharing a border with, extending from, etc.) the floor 104. The basin 102 also includes a first side wall 110. The first side wall 110 is contiguous with the floor 104 and the front wall 108. In some embodiments, the front wall 108 and the first side wall 110 are approximately (e.g., within 5% of, etc.) orthogonal.

The basin 102 also includes a rear wall 112. The rear wall 112 is contiguous with the floor 104 and the first side wall 110. In some embodiments, the front wall 108 and the rear wall 112 are approximately parallel.

The basin 102 also includes a second side wall 114. The second side wall 114 is contiguous with the floor 104, the front wall 108, and the rear wall 112. In some embodiments, the front wall 108 and the second side wall 114 are approximately orthogonal. In some embodiments, the rear wall 112 and the second side wall 114 are approximately orthogonal. In various embodiments, the front wall 108, the first side wall 110, the rear wall 112, and the second side wall 114 generally define a rectangle or a square.

The basin 102 also includes a basin rim 116. As is explained in more detail herein, the basin rim 116 facilitates attachment of the basin 102 to an apron 118 (e.g., skirt, panel, etc.) and support of the basin 102 on a counter structure 120 (e.g., support, beam, chassis, etc.).

The basin rim 116 includes a rim front side 122. The rim front side 122 is contiguous with the front wall 108 and extends (e.g., projects, protrudes, etc.) from the front wall 108 away from the rear wall 112. In various embodiments, the rim front side 122 is coupled to (e.g., attached to, fastened to, adhered to, etc.) the apron 118. In some embodiments, the rim front side 122 interfaces with the counter structure 120 (e.g., on a beam of the counter structure 120, etc.).

The basin rim 116 also includes a rim first side 124. The rim first side 124 is contiguous with the first side wall 110 and the rim front side 122. The rim first side 124 extends from the first side wall 110 away from the second side wall 114. In some embodiments, the rim first side 124 interfaces with the counter structure 120 (e.g., on a beam of the counter structure 120, etc.).

The basin rim 116 also includes a rim rear side 126. The rim rear side 126 is contiguous with the rear wall 112 and the rim first side 124 and extends from the rear wall 112 away from the front wall 108. In various embodiments, the rim rear side 126 is not coupled to the apron 118. In some embodiments, the rim rear side 126 interfaces with the counter structure 120 (e.g., on a beam of the counter structure 120, etc.).

The basin rim 116 also includes a rim second side 128. The rim second side 128 is contiguous with the second side wall 114, the rim rear side 126, and the rim front side 122. The rim second side 128 extends from the second side wall 114 away from the first side wall 110. In some embodiments, the rim second side 128 interfaces with the counter structure 120 (e.g., on a beam of the counter structure 120, etc.).

In some embodiments, at least a portion of the rim front side 122, at least a portion of the rim first side 124, at least a portion of the rim rear side 126, and at least a portion of the rim second side 128 are disposed along the same plane. In this way, the basin rim 116 may be positioned at a uniform distance from a counter 130 of the counter structure 120.

As shown in FIG. 2, the rim front side 122 includes a stepped portion 132 and a rim shelf 134. The rim shelf 134 partially surrounds (e.g., borders, etc.) the stepped portion 132. The stepped portion 132 is extended (e.g., protruded, projected, etc.) relative to the rim shelf 134. In other words, the stepped portion 132 is disposed along a plane that is separated from a plane along which the rim shelf 134 is disposed, and the plane along which the stepped portion 132 is disposed is closer to the floor 104 than the plane along which the rim shelf 134 is disposed.

The rim front side 122 includes a plurality of apertures 136 (e.g., holes, etc.) disposed in the stepped portion 132. For example, the rim front side 122 may include four apertures 136 uniformly distributed along the stepped portion 132 (e.g., an adjacent pair of the apertures 136 are separated from each other by a distance that is the same as a distance separating another adjacent pair of the apertures 136, etc.). In various embodiments, the apertures 136 are not through-holes. In other words, the apertures 136 do not extend entirely though the stepped portion 132. As a result, a top surface of the rim front side 122 (e.g., a surface of the rim front side 122 that is farthest from the floor 104, etc.) is uninterrupted across the apertures 136.

Figure 5:
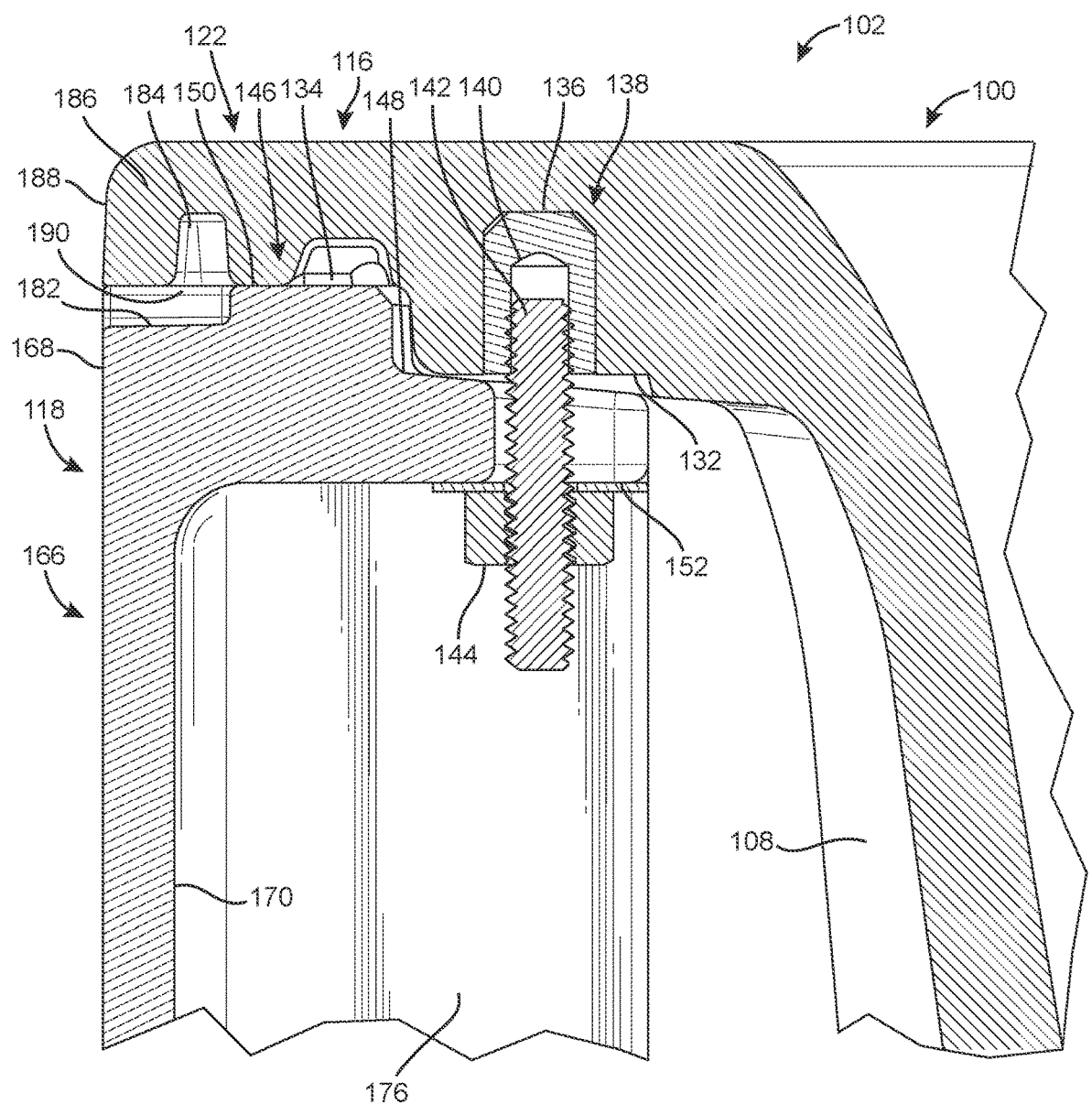
FIG. 5 is a cross-sectional view of the sink system shown in FIG. 4 taken along plane A-A.

As shown in FIG. 5, the sink system 100 also includes a plurality of basin rim inserts 138 (e.g., plugs, etc.). Each of the apertures 136 is configured to receive one of the basin rim inserts 138. For example, each of the basin rim inserts 138 may be press fit into one of the apertures 136. In some embodiments, adhesive is placed into the apertures 136 prior to the basin rim inserts 138 being inserted into the apertures 136. In these embodiments, the basin rim inserts 138 may be coupled to the stepped portion 132 via the adhesive and/or a friction fit between the basin rim inserts 138 and the apertures 136. In some embodiments, the basin rim inserts 138 are molded into the apertures 136. In some embodiments, the basin rim inserts 138 are integrally formed with the rim front side 122 (e.g., the rim front side 122 is molded around the basin rim inserts 138, etc.).

Each of the basin rim inserts 138 has an aperture 140 (e.g., hole, etc.). The apertures 140 are threaded. Each of the apertures 140 is configured to receive a threaded fastener 142 (e.g., bolt, etc.). The threaded fasteners 142 are configured to be coupled to the basin rim 116 via the apertures 140 without direct interfacing between the threaded fasteners 142 and the basin rim 116. As a result, mechanical stresses and strains on the basin rim 116 may be minimized. Each of the threaded fasteners 142 is configured to receive a nut 144. As is explained in more detail herein, the basin rim inserts 138, the threaded fasteners 142, and the nuts 144 cooperate to facilitate coupling of the apron 118 to the basin 102.

Figure 6:
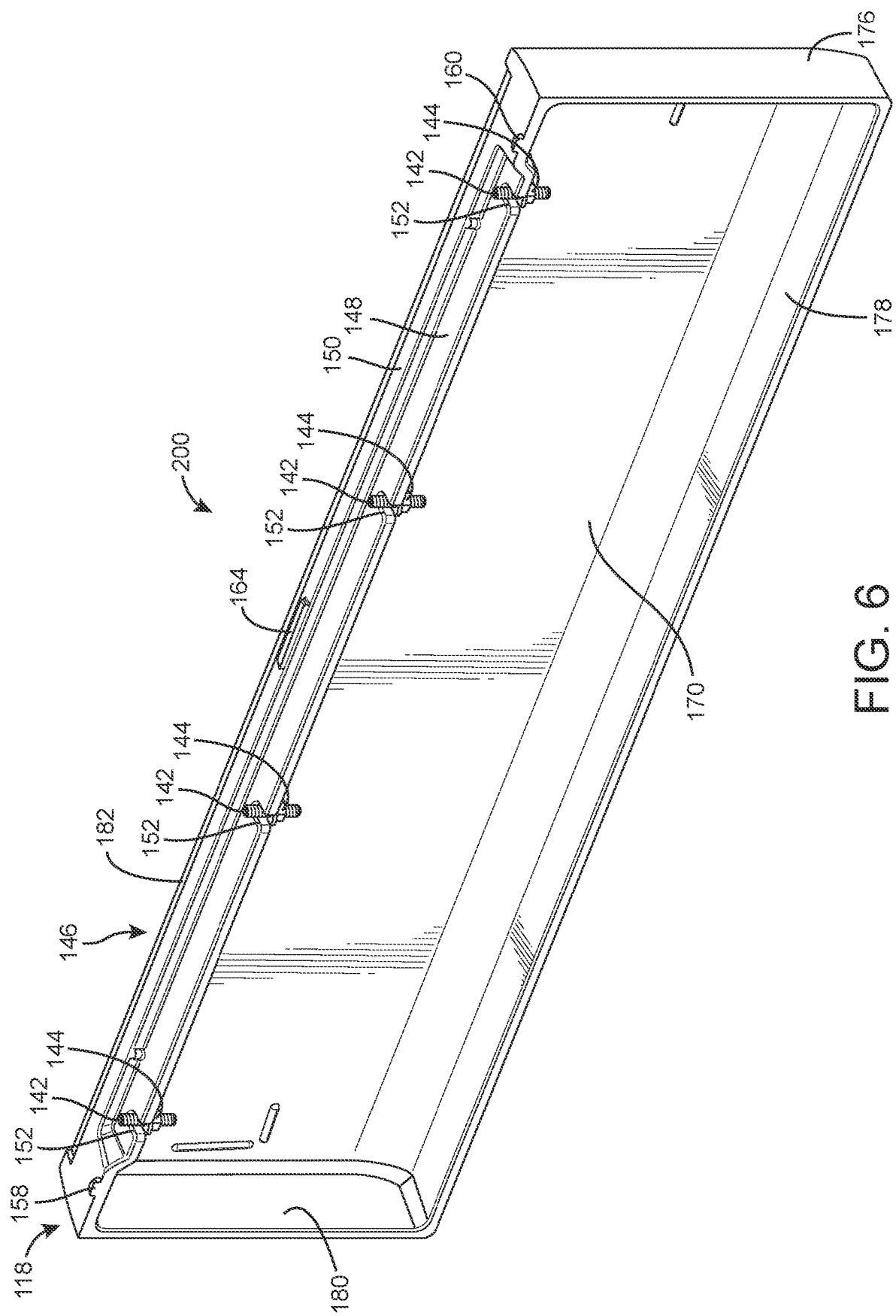
FIG. 6 is a rear perspective view of an apron for the sink system of FIG. 1.
Figure 7:
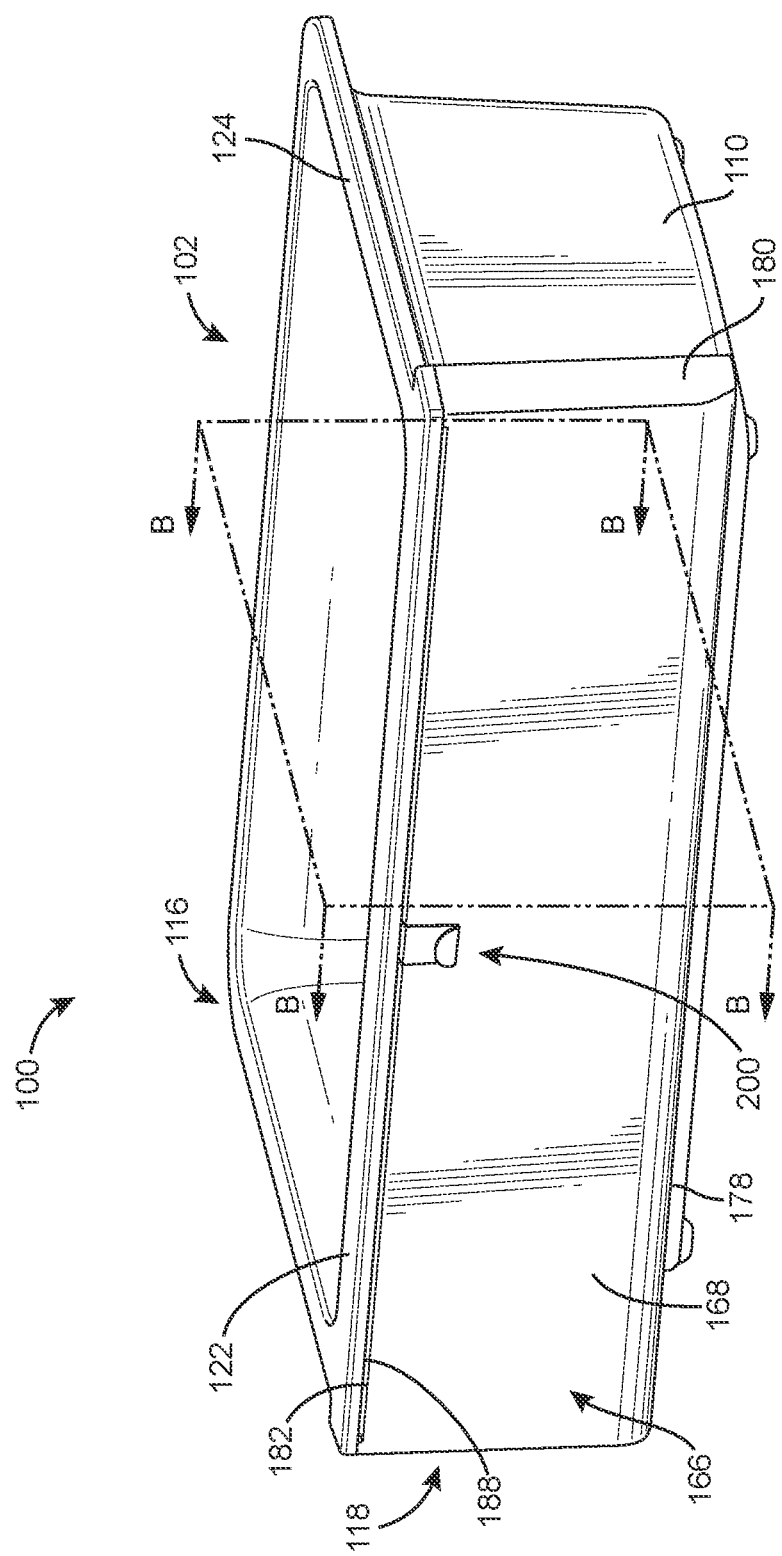
FIG. 7 is a front perspective view of a sink system according to another example embodiment.

As shown in FIG. 6, the apron 118 includes an apron coupling wall 146. As is explained in more detail herein, the apron coupling wall 146 is configured to facilitate coupling of the apron 118 to the basin 102. The apron coupling wall 146 includes an inner recessed portion 148 and an apron shelf 150. The apron shelf 150 partially surrounds the inner recessed portion 148. The inner recessed portion 148 is recessed relative to the apron shelf 150. In other words, the inner recessed portion 148 is disposed along a plane that is separated from a plane along which the apron shelf 150 is disposed, and the plane along which the inner recessed portion 148 is disposed is closer to the floor 104 than the plane along which the apron shelf 150 is disposed, when the apron 118 is coupled to the basin 102. When the apron 118 is coupled to the basin 102, at least a portion of the apron shelf 150 is separated from the front wall 108 by the inner recessed portion 148.

The inner recessed portion 148 is configured to receive the stepped portion 132 such that the apron shelf 150 interfaces with the rim shelf 134 when the stepped portion 132 is received within the inner recessed portion 148. The inner recessed portion 148 and the stepped portion 132 may both be chamfered, filleted, drafted, or otherwise shaped such that the inner recessed portion 148 is guided onto and over the stepped portion 132 when the apron 118 is lifted towards the basin 102 and subsequently coupled to the basin 102.

The inner recessed portion 148 includes a plurality of apron slots 152 (e.g., elongated holes, slits, etc.). Each of the apron slots 152 is configured to be aligned with one of the apertures 136 when the apron 118 is coupled to the basin 102. Furthermore, each of the apron slots 152 is configured to receive one of the threaded fasteners 142.

To couple the apron 118 to the basin 102, the basin rim inserts 138 are first inserted into the apertures 140. Next, the threaded fasteners 142 are threaded into the apertures 140. The apron 118 is then lifted and the apron slots 152 are aligned with the threaded fasteners 142, which are each extending from one of the apertures 136. The apron 118 is then translated towards the basin 102, such that the apron coupling wall 146 is located underneath and in confronting relation with the rim front side 122. This causes the stepped portion 132 to be received within the inner recessed portion 148, and for the rim shelf 134 to interface with the apron shelf 150. As a result, the threaded fasteners 142 are received within the apron slots 152. Finally, the nuts 144 are threaded onto the threaded fasteners 142 such that the apron coupling wall 146 is tightened against the rim front side 122. The apron slots 152 may facilitate adjustment of the apron 118 relative to the basin 102 (e.g., tilting of the apron coupling wall 146 relative to the rim front side 122, etc.) as the nuts 144 are being tightened.

In various embodiments, the threaded fasteners 142 and the nuts 144 are replaced with push-nut fasteners. Each push-nut fastener includes a base that is received within one of the apertures 140 and one of the apron slots 152. The base includes an aperture and at least one moveable portion. Each push-nut fastener also includes a bolt that is configured to be received within the apertures of the bases. As the nut is inserted into the aperture of the base, the nut contacts the moveable portion and causes the moveable portion to be displaced radially outwards, such that the moveable portion protrudes from the base when the nut is inserted into the aperture. By inserting the base into the aperture 140 and the apron slot 152, and then inserting the nut into the aperture of the base, the moveable portion can be deflected outwards (e.g., into contact with the aperture 140 and/or the apron slot 152) and provide a retention of the nut within the aperture. This retention may be transferred by the nut to the apron 118, thereby causing the apron 118 to be retained on the basin 102.

In various embodiments, the rim front side 122 includes a first end recess 154 and a second end recess 156. The first end recess 154 and the second end recess 156 are both disposed in the rim shelf 134. The first end recess 154 is located proximate the rim first side 124 and the second end recess 156 is located proximate the rim second side 128. In these embodiments, the apron coupling wall 146 includes a first end projection 158 and a second end projection 160. The first end projection 158 and the second end projection 160 are both disposed in the apron shelf 150. The first end recess 154 is configured to receive the first end projection 158 when the rim shelf 134 interfaces with the apron shelf 150. Similarly, the second end recess 156 is configured to receive the second end projection 160 when the rim shelf 134 interfaces with the apron shelf 150. When the apron 118 is not desirably aligned with the basin 102, the first end projection 158 may interface with the rim shelf 134 and/or the second end projection 160 may interface with the rim shelf 134. In this way, the first end recess 154, the second end recess 156, the first end projection 158, and the second end projection 160 cooperate to decrease a likelihood of the apron 118 being coupling to the basin 102 when the apron 118 is not desirably aligned with the basin 102. In various embodiments, the first end recess 154 and the second end recess 156 are not through-holes. In other words, the rim first side 124 and the second end recess 156 do not extend entirely though the rim shelf 134. As a result, a top surface of the rim front side 122 (e.g., a surface of the rim front side 122 that is farthest from the floor 104, etc.) is uninterrupted across the rim front side 122.

In various embodiments, the rim front side 122 includes a central recess 162. The central recess 162 is disposed in the rim shelf 134. The central recess 162 is located proximate a midpoint of the rim front side 122 (e.g., at an approximately equal distance from the rim first side 124 and the rim second side 128, etc.). In these embodiments, the apron coupling wall 146 includes a central projection 164. The central projection 164 is disposed in the apron shelf 150. The central recess 162 is configured to receive the central projection 164 when the rim shelf 134 interfaces with the apron shelf 150. When the apron 118 is not desirably aligned with the basin 102, the central projection 164 may interface with the rim shelf 134. In this way, the central recess 162 and the central projection 164 cooperate to decrease a likelihood of the apron 118 being coupling to the basin 102 when the apron 118 is not desirably aligned with the basin 102. In various embodiments, the central recess 162 is not a through-hole. In other words, the central recess 162 does not extend entirely though the rim shelf 134. As a result, a top surface of the rim front side 122 (e.g., a surface of the rim front side 122 that is farthest from the floor 104, etc.) is uninterrupted across the central recess 162.

In some embodiments, the rim front side 122 includes the first end recess 154, the second end recess 156, and the central recess 162, and the apron coupling wall 146 includes the first end projection 158, the second end projection 160, and the central projection 164.

The apron 118 also includes an apron panel wall 166. The apron panel wall 166 is contiguous with the apron coupling wall 146. The apron panel wall 166 extends from the apron coupling wall 146 away from the rim front side 122. The apron panel wall 166 defines an exterior surface 168 (e.g., face, etc.) and an interior surface 170 (e.g., face, etc.).

The exterior surface 168 has a target aesthetic appearance. For example, the exterior surface 168 may be textured, polished, and/or contain a design or image. In this way, the exterior surface 168 may provide a desired aesthetic benefit to a room within which the sink system 100 is installed. Advantageously, the sink system 100 is configured such that the apron 118 having an exterior surface 168 with a first target aesthetic appearance can be rapidly and easily interchanged with another apron 118 having an exterior surface 168 with a second target aesthetic appearance, while utilizing the same basin 102 and the same other components of the sink system 100. Additionally, the basin 102 can remain supported by the counter structure 120 while the apron 118 coupled to the basin 102 is uncoupled from the basin 102, and a new apron 118 is coupled to the basin 102. In this way, a user can rapidly and easily provide a desired aesthetic benefit to a room within which the sink system 100 is installed.

In various embodiments, the sink system 100 also includes a first coupling bracket 172 and a second coupling bracket 174. The first coupling bracket 172 is coupled to the first side wall 110 and the interior surface 170. Similarly, the second coupling bracket 174 is coupled to the second side wall 114 and the interior surface 170. Collectively, the first coupling bracket 172 and the second coupling bracket 174 aid in securing the apron 118 to the basin 102.

The apron 118 also includes a first connector wall 176. The first connector wall 176 is contiguous with the apron coupling wall 146 and the apron panel wall 166. The first connector wall 176 extends from the apron coupling wall 146 away from the rim front side 122 and from the apron panel wall 166 towards the front wall 108.

The apron 118 also includes an apron spanning wall 178. The apron spanning wall 178 is contiguous with the apron panel wall 166 and the first connector wall 176. The apron spanning wall 178 extends from the apron panel wall 166 towards the front wall 108 and from the first connector wall 176 away from the second side wall 114.

The apron 118 also includes a second connector wall 180. The second connector wall 180 is contiguous with the apron coupling wall 146, the apron panel wall 166, and the apron spanning wall 178. The second connector wall 180 extends from the apron coupling wall 146 away from the rim front side 122 and from the apron panel wall 166 towards the front wall 108.

III. Example Sink System with Apron Attachment

In various embodiments, the apron coupling wall 146 includes an outer recessed portion 182. The outer recessed portion 182 is partially surrounded by the apron shelf 150. Additionally, the outer recessed portion 182 is separated from the inner recessed portion 148 by the apron shelf 150. In embodiments where the apron coupling wall 146 includes the central projection 164, the central projection 164 is disposed on the apron shelf 150 between the outer recessed portion 182 and the inner recessed portion 148.

The outer recessed portion 182 is recessed relative to the apron shelf 150. In other words, the outer recessed portion 182 is disposed along a plane that is separated from a plane along which the apron shelf 150 is disposed, and the plane along which the outer recessed portion 182 is disposed is closer to the floor 104 than the plane along which the apron shelf 150 is disposed, when the apron 118 is coupled to the basin 102. Similarly, the plane along which the outer recessed portion 182 is disposed is closer to the apron spanning wall 178 than the plane along which the apron shelf 150 is disposed. The outer recessed portion 182 is contiguous with the exterior surface 168.

The rim shelf 134 includes an attachment recess 184. The attachment recess 184 is disposed along a straight line and is configured to be aligned with the outer recessed portion 182 when the apron 118 is coupled to the basin 102. In embodiments where the rim front side 122 includes the central recess 162, the central recess 162 is disposed on the rim front side 122 between the attachment recess 184 and the stepped portion 132.

The attachment recess 184 extends through the rim shelf 134 such that a lip 186 of the rim shelf 134 is formed between the attachment recess 184 and an exterior surface 188 of the rim front side 122. The attachment recess 184 is recessed relative to the rim shelf 134. In other words, the attachment recess 184 is disposed along a plane that is separated from a plane along which the rim shelf 134 is disposed, and the plane along which the attachment recess 184 is further from the floor 104 than the plane along which the rim shelf 134 is disposed.

When the apron 118 is coupled to the basin 102, the attachment recess 184 is aligned with the outer recessed portion 182. Collectively, the attachment recess 184 and the outer recessed portion 182 form an apron attachment channel 190 when the apron 118 is coupled to the basin 102. The apron attachment channel 190 is generally L-shaped or includes at least an L-shape.

As shown in FIGS. 2, 3, and 6-8, the sink system 100 also includes an apron attachment 200. The apron attachment 200 is configured to be received within the apron attachment channel 190 such that the apron attachment 200 is secured within the apron attachment channel 190. The apron attachment 200 is also configured to be removed from the apron attachment channel 190. Advantageously, the sink system 100 is configured such that the apron attachment 200 can be received within, and removed from, the apron attachment channel 190 without uncoupling the apron 118 from the basin 102. As is explained in more detail herein, the apron attachment 200 provides additional functionality to the sink system 100, thereby increasing the desirability of the sink system 100.

The apron attachment 200 includes an apron attachment coupler 202 and an apron attachment accessory 204. The apron attachment coupler 202 is configured to be received within, and removed from, the apron attachment channel 190.

The apron attachment coupler 202 includes a retainer portion 206 and a connector portion 208. The retainer portion 206 and the connector portion 208 are each configured to be received within the apron attachment channel 190. The connector portion 208 is contiguous with the retainer portion 206 and separates the apron attachment accessory 204 from the retainer portion 206. The connector portion 208 extends from the apron attachment channel 190 when the retainer portion 206 is received within the apron attachment channel 190.

Figure 8:
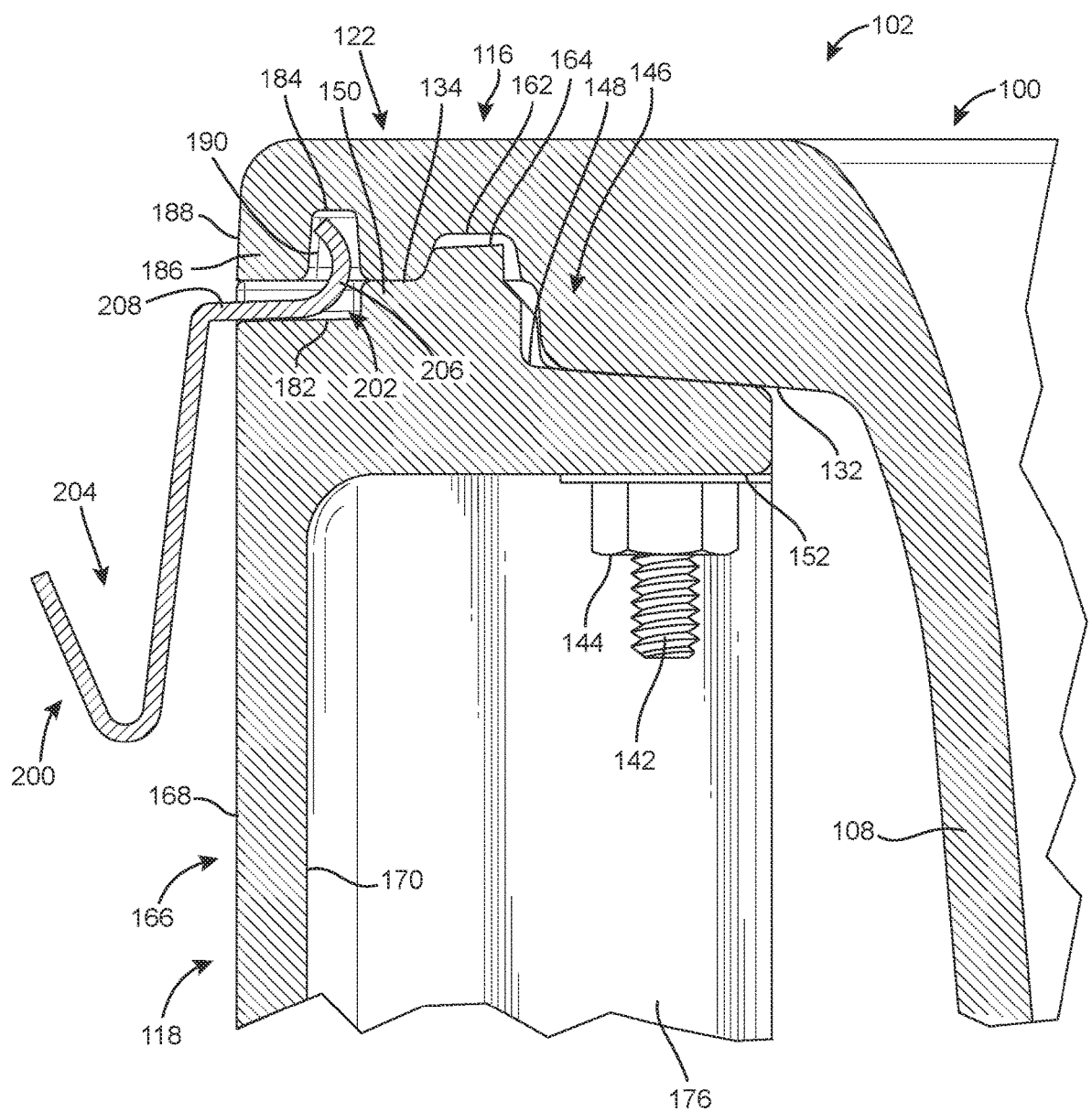
FIG. 8 is a cross-sectional view of the sink system shown in FIG. 7 taken along plane B-B.

As shown in FIG. 8, the retainer portion 206 is at least partially disposed within the attachment recess 184 when the apron attachment 200 is secured within the apron attachment channel 190. As a result, movement of the apron attachment 200 (e.g., towards the exterior surface 168, away from the exterior surface 168, etc.) may cause the retainer portion 206 to be biased against the lip 186 and/or the rim shelf 134.

Contact between the retainer portion 206 and the lip 186 may limit or resist movement of the retainer portion 206, and therefore movement of the connector portion 208 and the apron attachment accessory 204 (e.g., relative to the exterior surface 168, etc.). Similarly, contact between the retainer portion 206 and rim shelf 134 may limit or resist movement of the retainer portion 206, and therefore movement of the connector portion 208 and the apron attachment accessory 204 (e.g., relative to the exterior surface 168, etc.).

When the apron attachment 200 is secured within the apron attachment channel 190, the connector portion 208 extends between the lip 186 and the outer recessed portion 182. In various embodiments, the apron attachment channel 190 is configured such that the apron attachment 200 can be selectively repositioned (e.g., slid, etc.) along the apron attachment channel 190 (e.g., from a position proximate the first connector wall 176 to a position proximate the second connector wall 180, etc.).

To secure the apron attachment 200 to the apron attachment channel 190, the retainer portion 206 is first inserted between the lip 186 and the outer recessed portion 182. Then, the apron attachment 200 is rotated and the retainer portion 206 is inserted into the attachment recess 184 and between the lip 186 and the rim shelf 134. This insertion of the outer recessed portion 182 subsequently causes an insertion of the connector portion 208 between the lip 186 and the outer recessed portion 182.

In various embodiments, the apron attachment accessory 204 is a towel holder (e.g., hook, ring, stud, etc.). In other embodiments, the apron attachment accessory 204 is a sponge or brush holder (e.g., container, cup, tray, etc.). In still other embodiments, the apron attachment accessory 204 is a mobile device (e.g., cell phone, smart phone, etc.) holder.

In various embodiments, a portion of the outer recessed portion 182 is disposed closer to the first connector wall 176 than the attachment recess 184 and/or a portion of the outer recessed portion 182 is disposed closer to the second connector wall 180 than the attachment recess 184. As a result, the apron attachment 200 can be secured to the apron attachment channel 190 by sliding the retainer portion 206 and the connector portion 208 into the apron attachment channel 190 (e.g., towards the first connector wall 176, towards the second connector wall 180, etc.).

IV. Example Assembly Process for the Basin

Figure 9:
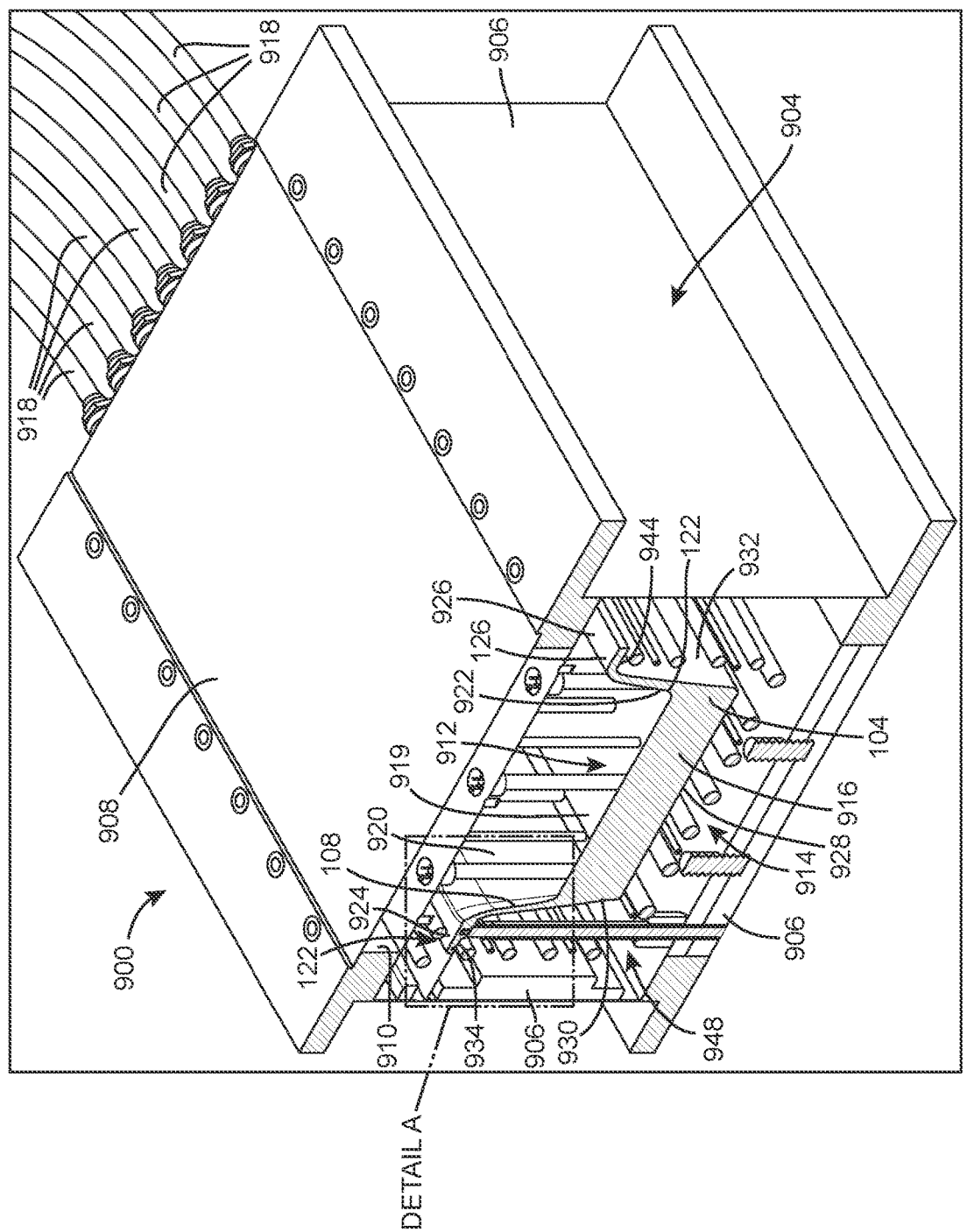
FIG. 9 is a perspective and cross-sectional view of a molding tool and basin according to an example embodiment.
Figure 10:
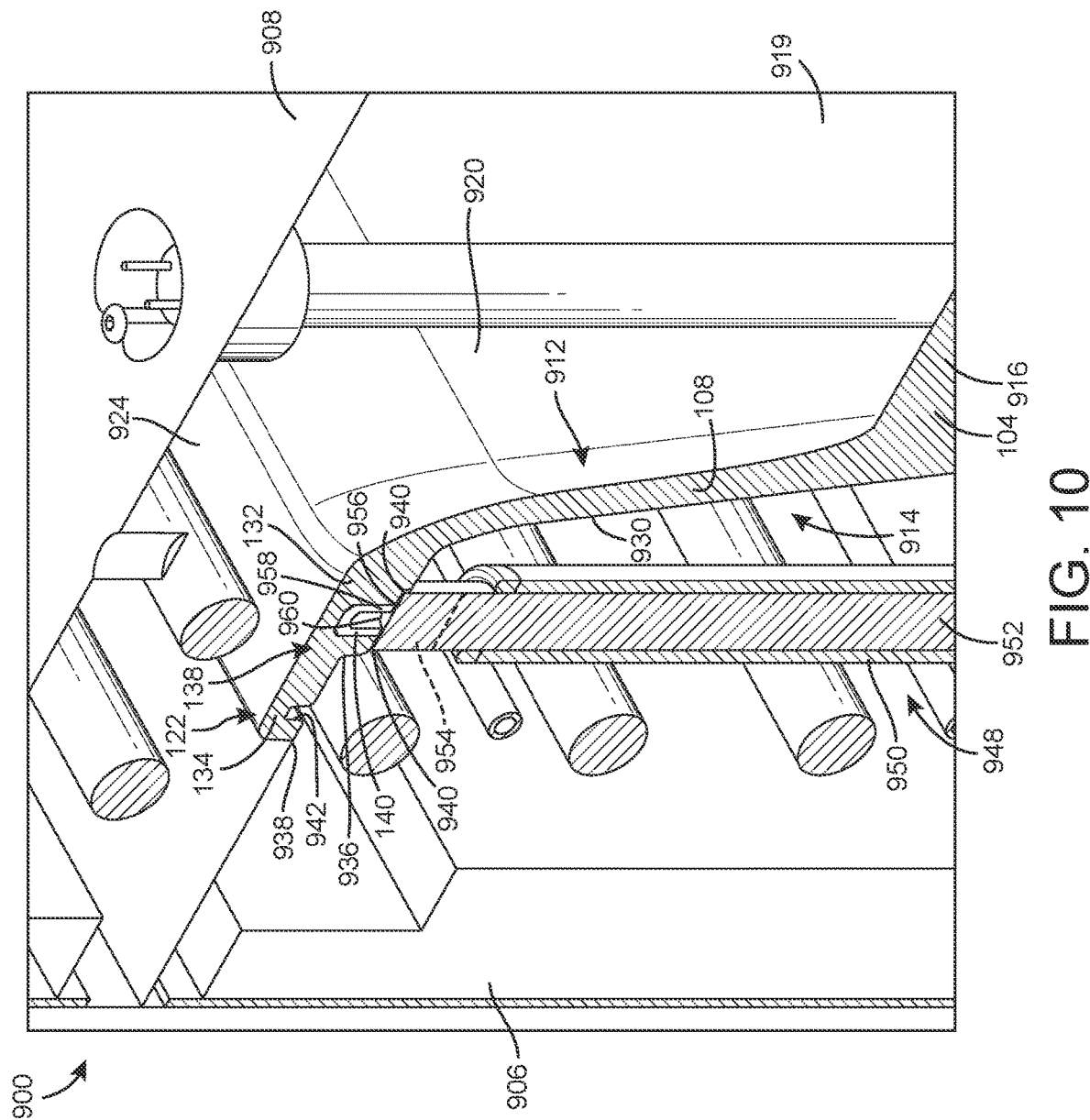
FIG. 10 is a view of Detail A in FIG. 9.
Figure 11:
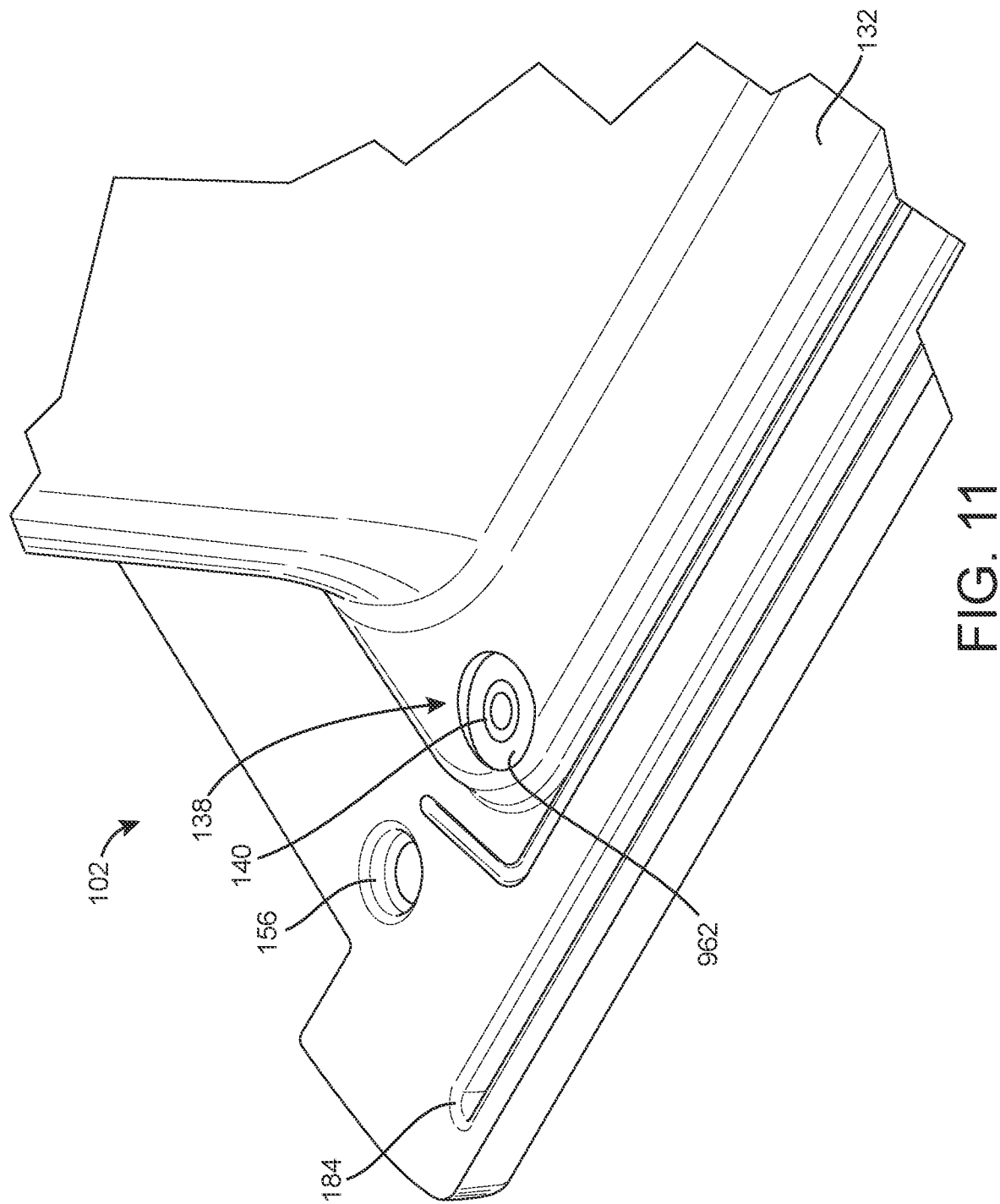
FIG. 11 is a view of a basin assembled by the molding tool shown in FIG. 9.

In various embodiments, the basin 102 is assembled via a molding (e.g., injection molding, etc.) process that causes the basin 102 to be molded around the basin rim inserts 138 (e.g., the basin rim inserts 138 are overmolded in the basin 102, etc.). This molding process is illustrated in FIGS. 9-11. It is understood that the basin 102 may be assembled in similar ways using various other methods such as, for example, casting, machining, and additive manufacturing (e.g., 3D printing, etc.).

The basin 102 is assembled using a molding tool 900 (e.g., injection molding tool, etc.). The molding tool 900 includes a body 902 that defines an internal chamber 904. The body 902 includes a plurality of fixed panels 906 (e.g., walls, etc.) and at least one removable panel 908 (e.g., wall, etc.). The fixed panels 906 and the removable panel 908 cooperate to define the internal chamber 904.

The fixed panels 906 define an opening 910 that is contiguous with the internal chamber 904. In other words, the opening 910 provides access into the internal chamber 904 from a location outside of the molding tool 900. The removable panel 908 is selectively coupled to the fixed panels 906 around the opening 910. When the removable panel 908 is coupled to the fixed panels 906 around the opening 910, access into the internal chamber 904 via the opening 910 is prohibited (e.g., the internal chamber 904 is sealed, etc.). However, when the removable panel 908 is not coupled to the fixed panels 906 around the opening 910, access into the internal chamber 904 via the opening 910 is facilitated (e.g., the internal chamber 904 is exposed, etc.).

The molding tool 900 includes a male molding insert 912 (e.g., die, form, etc.) and a female molding insert 914 (e.g., die, form, etc.). The male molding insert 912 and the female molding insert 914 cooperate to define a mold cavity 916 (e.g., void, etc.). The mold cavity 916 is a volume that is substantially identical to a volume of the basin 102. The molding tool 900 includes at least one fluid conveyer 918 (e.g., conduit, pipe, etc.). The molding tool 900 is configured to provide molding material (e.g., ceramic molding material, polymeric molding material, synthetic molding material, etc.) through the body 902 and into the mold cavity 916.

As is explained in more detail herein, the molding tool 900 facilitates solidification of the molding material in the mold cavity 916, separation of the male molding insert 912 and the female molding insert 914, and removal of the basin 102 from the molding tool 900. The male molding insert 912 is configured to border top surfaces and interior surfaces of the basin 102 (e.g., relative to the floor 104, etc.) when the basin 102 is formed within the mold cavity 916. Similarly, the female molding insert 914 is configured to border bottom surfaces and exterior surfaces of the basin 102 (e.g., relative to the floor 104, etc.) when the basin 102 is formed within the mold cavity 916.

The male molding insert 912 is defined by a melting temperature (e.g., a temperature at which the male molding insert 912 melts, etc.) that is higher than a melting temperature (e.g., a temperature at which the molding material melts, etc.) of the molding material and a processing temperature (e.g., a temperature at which the molding material is provided into the molding tool 900, etc.) of the molding material. For example, the male molding insert 912 may be metallic (e.g., constructed from aluminum, constructed from stainless steel, etc.) and have a melting temperature that is greater than a product of 1.3 and the processing temperature of the molding material.

Similarly, the female molding insert 914 is defined by a melting temperature (e.g., a temperature at which the female molding insert 914 melts, etc.) that is higher than a melting temperature (e.g., a temperature at which the molding material melts, etc.) of the molding material and a processing temperature (e.g., a temperature at which the molding material is provided into the molding tool 900, etc.) of the molding material. For example, the female molding insert 914 may be metallic (e.g., constructed from aluminum, constructed from stainless steel, etc.) and have a melting temperature that is greater than a product of 1.3 and the processing temperature of the molding material.

The male molding insert 912 includes a floor 919. The floor 919 is configured to border the floor 104 when the basin 102 is formed within the mold cavity 916. In various embodiments, the floor 919 includes a drain projection. The drain projection extends to the female molding insert 914 such that the drain 106 is formed as the molding material solidifies around the drain projection.

The male molding insert 912 also includes a front wall 920. The front wall 920 is configured to border the front wall 108 when the basin 102 is formed within the mold cavity 916. The front wall 920 is contiguous with the floor 919.

The male molding insert 912 also includes a first side wall. The first side wall is configured to border the first side wall 110 when the basin 102 is formed within the mold cavity 916. The first side wall is contiguous with the floor 919 and the front wall 920.

The male molding insert 912 also includes a rear wall 922. The rear wall 922 is configured to border the rear wall 112 when the basin 102 is formed within the mold cavity 916. The rear wall 922 is contiguous with the floor 919 and the first side wall. The rear wall 922 is separated from the front wall 920 by the first side wall and the floor 919.

The male molding insert 912 also includes a second side wall. The second side wall is configured to border the second side wall 114 when the basin 102 is formed within the mold cavity 916. The second side wall is contiguous with the floor 919, the front wall 920, and the rear wall 922. The second side wall separates the rear wall 922 from the front wall 920

The male molding insert 912 also includes a rim front wall 924. The rim front wall 924 is configured to border the rim front side 122 when the basin 102 is formed within the mold cavity 916. The rim front wall 924 is contiguous with the front wall 920.

The male molding insert 912 also includes a rim first side wall. The rim first side wall is configured to border the rim first side 124 when the basin 102 is formed within the mold cavity 916. The rim first side wall is contiguous with the first side wall and the rim front wall 924.

The male molding insert 912 also includes a rim rear side wall 926. The rim rear side wall 926 is configured to border the rim rear side 126 when the basin 102 is formed within the mold cavity 916. The rim rear side wall 926 is contiguous with the rear wall 922 and the rim first side wall. The rim rear side wall 926 is separated from the rim front wall 924 by the rim first side wall.

The male molding insert 912 also includes a rim second side wall. The rim second side wall is configured to border the rim second side 128 when the basin 102 is formed within the mold cavity 916. The rim second side wall is contiguous with the second side wall, the rim front wall 924, and the rim rear side wall 926.

The female molding insert 914 includes a floor 928. The floor 928 is located opposite the floor 919 when the male molding insert 912 and the female molding insert 914 are positioned within the internal chamber 904 and the mold cavity 916 is present. The floor 928 is configured to border the floor 104 when the basin 102 is formed within the mold cavity 916. In various embodiments, the floor 928 includes a drain projection. The drain projection extends to the floor 919 such that the drain 106 is formed as the molding material solidifies around the drain projection. In other embodiments, the floor 919 includes the drain projection and the drain projection extends to the floor 928. In still other embodiments, the floor 919 includes a first drain projection and the floor 928 includes a second drain projection. In these embodiments, the first drain projection and the second drain projection are aligned and in contact such that the drain 106 is formed as the molding material solidifies around the first drain projection and the second drain projection.

The female molding insert 914 also includes a front wall 930. The front wall 930 is located opposite the front wall 920 when the male molding insert 912 and the female molding insert 914 are positioned within the internal chamber 904 and the mold cavity 916 is present. The front wall 930 is configured to border the front wall 108 when the basin 102 is formed within the mold cavity 916. The front wall 930 is contiguous with the floor 928.

The female molding insert 914 also includes a first side wall. The first side wall of the female molding insert 914 is located opposite the first side wall of the male molding insert 912 when the male molding insert 912 and the female molding insert 914 are positioned within the internal chamber 904 and the mold cavity 916 is present. The first side wall is configured to border the first side wall 110 when the basin 102 is formed within the mold cavity 916. The first side wall is contiguous with the floor 928 and the front wall 930.

The female molding insert 914 also includes a rear wall 932. The rear wall 932 is located opposite the rear wall 922 when the male molding insert 912 and the female molding insert 914 are positioned within the internal chamber 904 and the mold cavity 916 is present. The rear wall 932 is configured to border the rear wall 112 when the basin 102 is formed within the mold cavity 916. The rear wall 932 is contiguous with the floor 928 and the first side wall. The rear wall 932 is separated from the front wall 930 by the first side wall and the floor 928.

The female molding insert 914 also includes a second side wall. The second side wall of the female molding insert 914 is located opposite the second side wall of the male molding insert 912 when the male molding insert 912 and the female molding insert 914 are positioned within the internal chamber 904 and the mold cavity 916 is present. The second side wall is configured to border the second side wall 114 when the basin 102 is formed within the mold cavity 916. The second side wall is contiguous with the floor 928, the front wall 930, and the rear wall 932. The second side wall separates the rear wall 932 from the front wall 930

The female molding insert 914 also includes a rim front wall 934. The rim front wall 934 is located opposite the rim front wall 924 when the male molding insert 912 and the female molding insert 914 are positioned within the internal chamber 904 and the mold cavity 916 is present. The rim front wall 934 is configured to border the rim front side 122 when the basin 102 is formed within the mold cavity 916. The rim front wall 934 is contiguous with the front wall 930.

The rim front wall 934 includes a stepped portion 936 and a rim shelf 938. The rim shelf 938 partially surrounds (e.g., borders, etc.) the stepped portion 936. The rim shelf 938 is extended (e.g., protruded, projected, etc.) relative to the stepped portion 936. In other words, the rim shelf 938 is disposed along a plane that is separated from a plane along which the stepped portion 936 is disposed, and the plane along which the rim shelf 938 is disposed is closer to the floor 928 than the plane along which the stepped portion 936 is disposed. The stepped portion 936 is configured to border the stepped portion 132 when the basin 102 is formed within the mold cavity 916. Similarly, the rim shelf 938 is configured to border the rim shelf 134 when the basin 102 is formed within the mold cavity 916.

The rim front wall 934 also includes a plurality of apertures 940 (e.g., holes, etc.) disposed in the stepped portion 936. For example, the rim front wall 934 may include four apertures 940 uniformly distributed along the stepped portion 936 (e.g., an adjacent pair of the apertures 940 are separated from each other by a distance that is the same as a distance separating another adjacent pair of the apertures 940, etc.). Each of the apertures 940 is a through-hole. In other words, each of the apertures 940 extends entirely through the stepped portion 936. As is explained in more detail herein, each of the apertures 940 is configured to receive one of the basin rim inserts 138.

The rim front wall 934 also includes an attachment recess 942 disposed in the rim shelf 938. The attachment recess 942 is disposed along a straight line. The attachment recess 942 is configured to border the attachment recess 184 when the basin 102 is formed within the mold cavity 916.

In various embodiments, the rim front wall 934 also includes a central recess disposed in the rim shelf 938. The central recess is configured to border the central recess 162 when the basin 102 is formed within the mold cavity 916. The central recess may be disposed in the rim shelf 938 between the attachment recess 942 and the stepped portion 936.

In various embodiments, the rim front wall 934 also includes a first end recess disposed in the rim shelf 938. The first end recess is configured to border the first end recess 154 when the basin 102 is formed within the mold cavity 916. The rim front wall 934 also includes a second end recess disposed in the rim shelf 938. The second end recess is configured to border the second end recess 156 when the basin 102 is formed within the mold cavity 916.

The female molding insert 914 also includes a rim first side wall. The rim first side wall of the female molding insert 914 is located opposite the rim first side wall of the male molding insert 912 when the male molding insert 912 and the female molding insert 914 are positioned within the internal chamber 904 and the mold cavity 916 is present. The rim first side wall is configured to border the rim first side 124 when the basin 102 is formed within the mold cavity 916. The rim first side wall is contiguous with the first side wall and the rim front wall 934.

The female molding insert 914 also includes a rim rear side wall 944. The rim rear side wall 926 is located opposite the rim rear side wall 926 when the male molding insert 912 and the female molding insert 914 are positioned within the internal chamber 904 and the mold cavity 916 is present. The rim rear side wall 944 is configured to border the rim rear side 126 when the basin 102 is formed within the mold cavity 916. The rim rear side wall 944 is contiguous with the rear wall 932 and the rim first side wall. The rim rear side wall 944 is separated from the rim front wall 934 by the rim first side wall.

The female molding insert 914 also includes a rim second side wall. The rim second side wall of the female molding insert 914 is located opposite the rim second side wall of the male molding insert 912 when the male molding insert 912 and the female molding insert 914 are positioned within the internal chamber 904 and the mold cavity 916 is present. The rim second side wall is configured to border the rim second side 128 when the basin 102 is formed within the mold cavity 916. The rim second side wall is contiguous with the second side wall, the rim front wall 934, and the rim rear side wall 944.

The molding tool 900 also includes a plurality of insert jigs 948. The number of insert jigs 948 is equal to the number of basin rim inserts 138. As is explained in more detail herein, the insert jigs 948 are utilized by the molding tool 900 to locate the basin rim inserts 138 within the mold cavity 916 such that the molding material forms around the basin rim inserts 138. The insert jigs 948 are only utilized during assembly of the basin 102 and are detached from the molding material as the basin 102 is removed from the molding tool 900.

Each of the insert jigs 948 includes a sleeve 950 and a cylinder 952. The sleeve 950 is coupled to at least one of the fixed panels 906. The cylinder 952 is located within the sleeve 950 and is configured to be selectively repositioned within the sleeve 950. The cylinder 952 includes an end 954 having an end face 956. The end 954 is configured to be received within one of the apertures 940 and is configured to interface with the molding material. The end 954 is sized such that, when the end 954 is received within one of the apertures 940, a gap between the end 954 and the aperture 940 is less than 0.01 inches. As a result, leakage of molding material between the apertures 940 and the ends 954 may be substantially minimized. For example, a diameter of each of the apertures 940 may be approximately equal to 101% to 103%, inclusive, of a diameter of each of the ends 954.

The cylinder 952 also includes a pin 958 that extends from the end face 956 (e.g., away from the end face 956). The pin 958 is configured to be received within the aperture 140. Prior to providing molding material into the mold cavity 916, the basin rim inserts 138 are each coupled to one of the insert jigs 948 by aligning each of the pins 958 with one of the apertures 140 and pressing the basin rim inserts 138 toward the end faces 956. An interaction between the pin 958 and the basin rim insert 138 within which the pin 958 is received causes the basin rim insert 138 to be retained relative to the pin 958, and therefore relative to the female molding insert 914. This interaction may substantially preventing the basin rim inserts 138 from becoming dislodged by the molding material. As a result, a desirability of the basin 102 may be increased.

An adhesive 960 (e.g., glue, superglue, bonding agent, etc.) is applied to the pins 958 prior to insertion of the pins 958 into the apertures 140. The adhesive 960 cures to secure the basin rim inserts 138 to the pins 958. Additionally, the adhesive 960 may create a seal between the pins 958 and the apertures 140. In this way, leakage of molding material between the pins 958 and the apertures 140 may be substantially minimized.

The adhesive 960 is defined by a melting temperature (e.g., a temperature at which the adhesive 960 melts, etc.) that is higher than a melting temperature (e.g., a temperature at which the molding material melts, etc.) of the molding material and a processing temperature (e.g., a temperature at which the molding material is provided into the molding tool 900, etc.) of the molding material. For example, the adhesive 960 may have a melting temperature that is greater than a product of 1.3 and the processing temperature of the molding material.

In some embodiments, insertion of the pins 958 into the apertures 140 may cause deformation (e.g., stretching, etc.) of the basin rim inserts 138. This deformation may form a seal between the pins 958 and the apertures 140. In this way, leakage of molding material between the pins 958 and the apertures 140 may be substantially minimized.

The basin rim inserts 138 are each defined by a melting temperature (e.g., a temperature at which the basin rim inserts 138 melt, etc.) that is higher than a melting temperature (e.g., a temperature at which the molding material melts, etc.) of the molding material and a processing temperature (e.g., a temperature at which the molding material is provided into the molding tool 900, etc.) of the molding material. For example, the basin rim inserts 138 may be metallic (e.g., constructed from aluminum, constructed from stainless steel, etc.) and have a melting temperature that is greater than a product of 1.3 and the processing temperature of the molding material.

As is explained in more detail herein, as the basin 102 is formed within the mold cavity 916, the molding material bonds to the end faces 956 around the basin rim inserts 138. After the molding material solidifies within the mold cavity 916, the ends 954 are displaced relative to the mold cavity 916, thereby causing separation of the end faces 956 from the stepped portion 132. As a result, end recesses 962 are formed in the stepped portion 132. Each of the end recesses 962 is disposed over one of the basin rim inserts 138.

The ends 954, and therefore the pins 958, are each defined by a melting temperature (e.g., a temperature at which the ends 954 melt, etc.) that is higher than a melting temperature (e.g., a temperature at which the molding material melts, etc.) of the molding material and a processing temperature (e.g., a temperature at which the molding material is provided into the molding tool 900, etc.) of the molding material. For example, the ends 954 may be metallic (e.g., constructed from aluminum, constructed from stainless steel, etc.) and have a melting temperature that is greater than a product of 1.3 and the processing temperature of the molding material.

Figure 12:
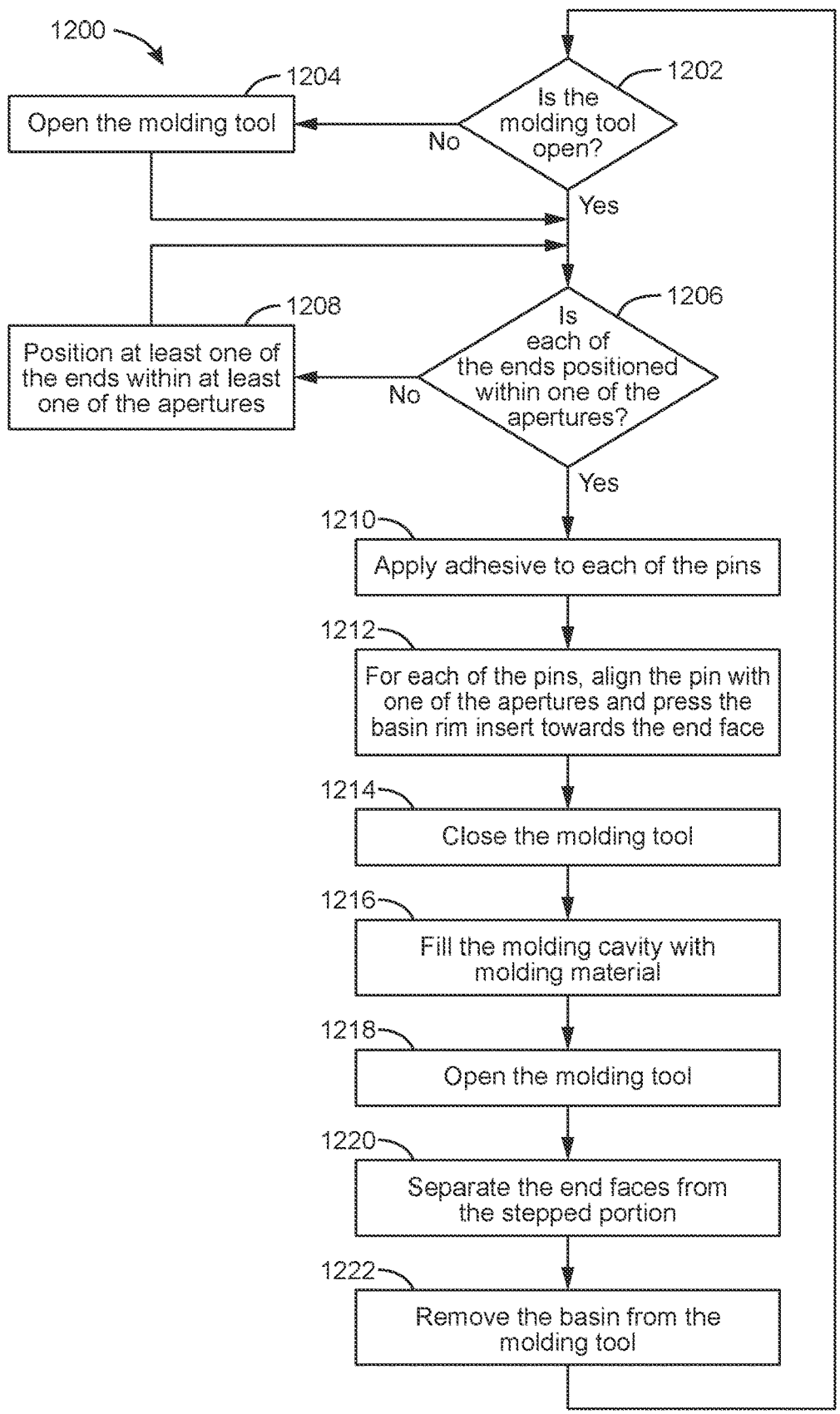
FIG. 12 is a flowchart of an assembly process for a basin according to an example embodiment.

FIG. 12 illustrates an example assembly process 1200 for assembling the basin 102. The assembly process 1200 begins in block 1202 with determining, by a user and/or by the molding tool 900 (e.g., via sensors of the molding tool 900, etc.), if the molding tool 900 is open. For example, the molding tool 900 may be open when the removable panel 908 is not coupled to the fixed panels 906 around the opening 910.

If in block 1202 the molding tool 900 is closed (e.g., is not open, etc.), the assembly process 1200 continues in block 1204 with opening, by the user and/or the molding tool 900, the molding tool 900 (e.g., via a user interface, etc.). For example, the molding tool 900 may instruct the user to open the molding tool 900. When the molding tool 900 is open, the male molding insert 912 is separated from the female molding insert 914, and the mold cavity 916 is not defined by the molding tool 900. In some embodiments, the molding tool 900 is opened by uncoupling the removable panel 908 from the fixed panels 906 and separating the removable panel 908 from the fixed panels 906.

If in block 1202 the molding tool 900 is open or once the molding tool 900 has been opened, the assembly process 1200 continues in block 1206 with determining, by the user and/or the molding tool, if each of the ends 954 is positioned within one of the apertures 940. For example, the molding tool 900 may query the user to manually determine if each of the ends 954 is positioned within one of the apertures 940 and then, if so, to provide such an indication to the molding tool 900 (e.g., via an interactive user interface, etc.). In another example, the molding tool 900 may utilize sensors to determine if each of the ends 954 is positioned within one of the apertures 940.

If in block 1206, any of the ends 954 are not positioned within one of the apertures 940, the assembly process 1200 continues in block 1208 with positioning, by the user and/or the molding tool 900, at least one of the ends 954 within at least one of the apertures 940. For example, the molding tool 900 may query the user to manually raise the cylinders 952 such that the ends 954 are positioned within the apertures 940 and then, when completed, to provide such an indication to the molding tool 900 (e.g., via an interactive user interface, etc.). In another example, the molding tool 900 may raise at least one of the cylinders 952 so as to cause the cylinders 952 to be positioned within the apertures 940. The assembly process 1200 then continues back to block 1206 (e.g., to ensure that each of the ends 954 is positioned within one of the apertures 940, etc.).

If in block 1206, each of the ends 954 is positioned within one of the apertures 940, the assembly process 1200 continues in block 1210 with applying, by the user and/or the molding tool 900, the adhesive 960 to each of the pins 958. For example, the molding tool 900 may query the user to manually apply the adhesive to each of the pins 958 and then, when completed, to provide such an indication to the molding tool 900 (e.g., via an interactive user interface, etc.).

The assembly process 1200 continues in block 1212 with, for each of the pins 958, aligning, by the user and/or the molding tool 900, the pin 958 with an aperture 140 of a basin rim insert and pressing the basin rim insert 138 towards an end face 956 from which the pin 958 projects. For example, the molding tool 900 may query the user to align each of the pins 958 with one of the apertures 140 and to manually press each of the basin rim inserts 138 towards one of the end faces 956 and then, when completed, to provide such an indication to the molding tool 900 (e.g., via an interactive user interface, etc.).

The assembly process 1200 then continues in block 1214 with closing, by the user and/or the molding tool 900, the molding tool 900. For example, the molding tool 900 may instruct the user to close the molding tool 900 (e.g., via a user interface, etc.). When the molding tool 900 is closed, the male molding insert 912 and the female molding insert 914 cooperate to define the mold cavity 916. In some embodiments, the molding tool 900 is closed by coupling the removable panel 908 to the fixed panels 906.

The assembly process 1200 then continues in block 1216 with filling, by the user and/or the molding tool 900, the mold cavity 916 with the molding material. For example, the molding tool 900 may provide the molding material into the mold cavity 916 via the fluid conveyers 918.

In some embodiments, the block 1216 is not performed until a target time has elapsed since the block 1210 was completed. The target time may be associated with a curing time of the adhesive. By adjusting the target time, curing of the adhesive 960 for each of the pins 958 may be facilitated. When the adhesive 960 is cured, a bond strength between the adhesive 960 and the pins 958 may be maximized and a bond strength between the adhesive 960 and the aperture 140 may be maximized.

The assembly process 1200 then continues in block 1218 with opening, by the user and/or the molding tool 900, the molding tool 900. For example, the molding tool 900 may instruct the user to open the molding tool 900. When the molding tool 900 is open, the male molding insert 912 is separated from the female molding insert 914, and the mold cavity 916 is not defined by the molding tool 900. In some embodiments, the molding tool 900 is opened by uncoupling the removable panel 908 from the fixed panels 906 and separating the removable panel 908 from the fixed panels 906.

The assembly process 1200 then continues in block 1220 with separating, by the user and/or the molding tool 900, the end faces 956 from the stepped portion 132. For example, the molding tool 900 may instruct the user to lower the cylinders 952, thereby causing separation of the end faces 956 from the stepped portion 132. The adhesive 960 is selected so as to have a bond strength (e.g., between the pin 958 and the aperture 140, etc.) that is less than a bond strength of the molding material. As a result, the basin rim inserts 138 remain embedded in the molding material when the end faces 956 are separated from the stepped portion 132.

In various embodiments, the end faces 956 are configured to minimize a bond strength between the end faces 956 and the molding material. For example, the end faces 956 may be relatively smooth (e.g., have a relatively low surface roughness, etc.), thereby minimizing surface area to which the molding material may bond. In some embodiments, the end faces 956 are coated (e.g., with lubricant, etc.) so as to mitigate bonding between the molding material and the end faces 956.

The assembly process 1200 then concludes in block 1222 with removing, by the user and/or the molding tool 900, the basin 102 from the molding tool 900. For example, the user may lift the basin 102 from the molding tool 900. When the basin 102 is removed from the molding tool 900, the basin rim inserts 138 remain embedded within the basin 102. The assembly process 1200 may then be repeated for assembly of additional basins 102.

V. Example Sink Deck System

Figure 13:
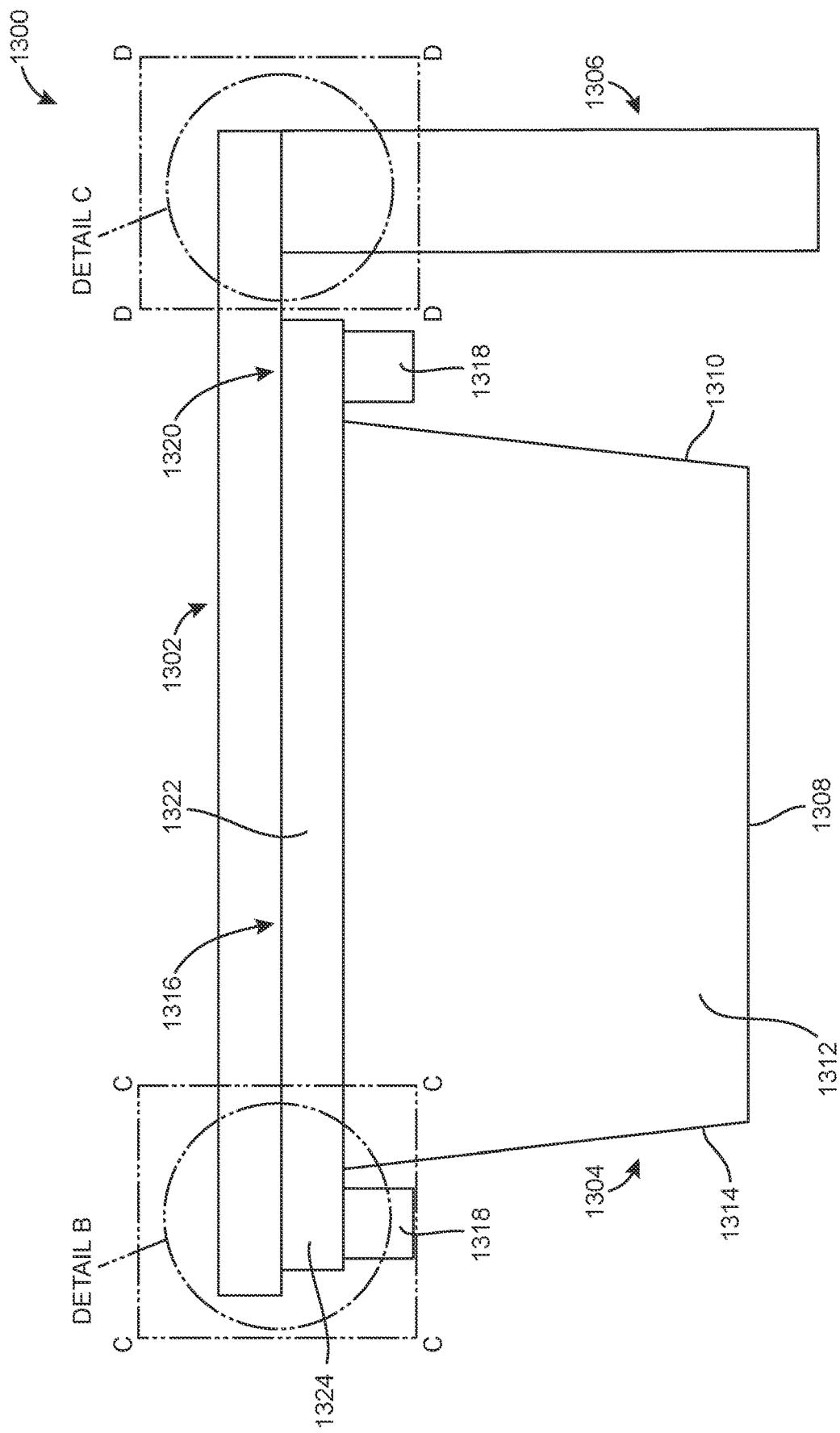
FIG. 13 is a side view of a sink deck system according to an example embodiment.
Figure 14:
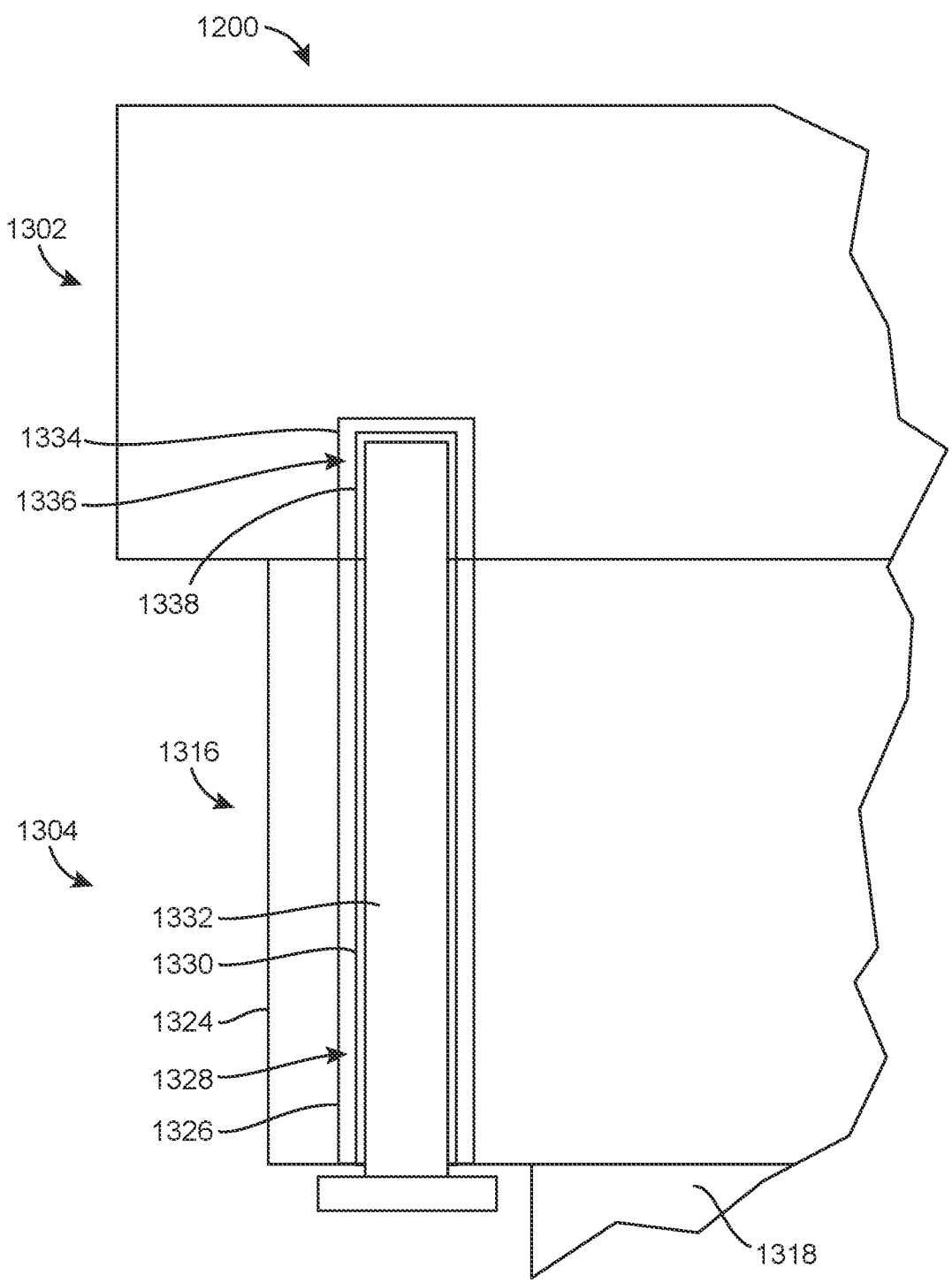
FIG. 14 is a view of Detail B in FIG. 13 taken along plane C-C.
Figure 15:
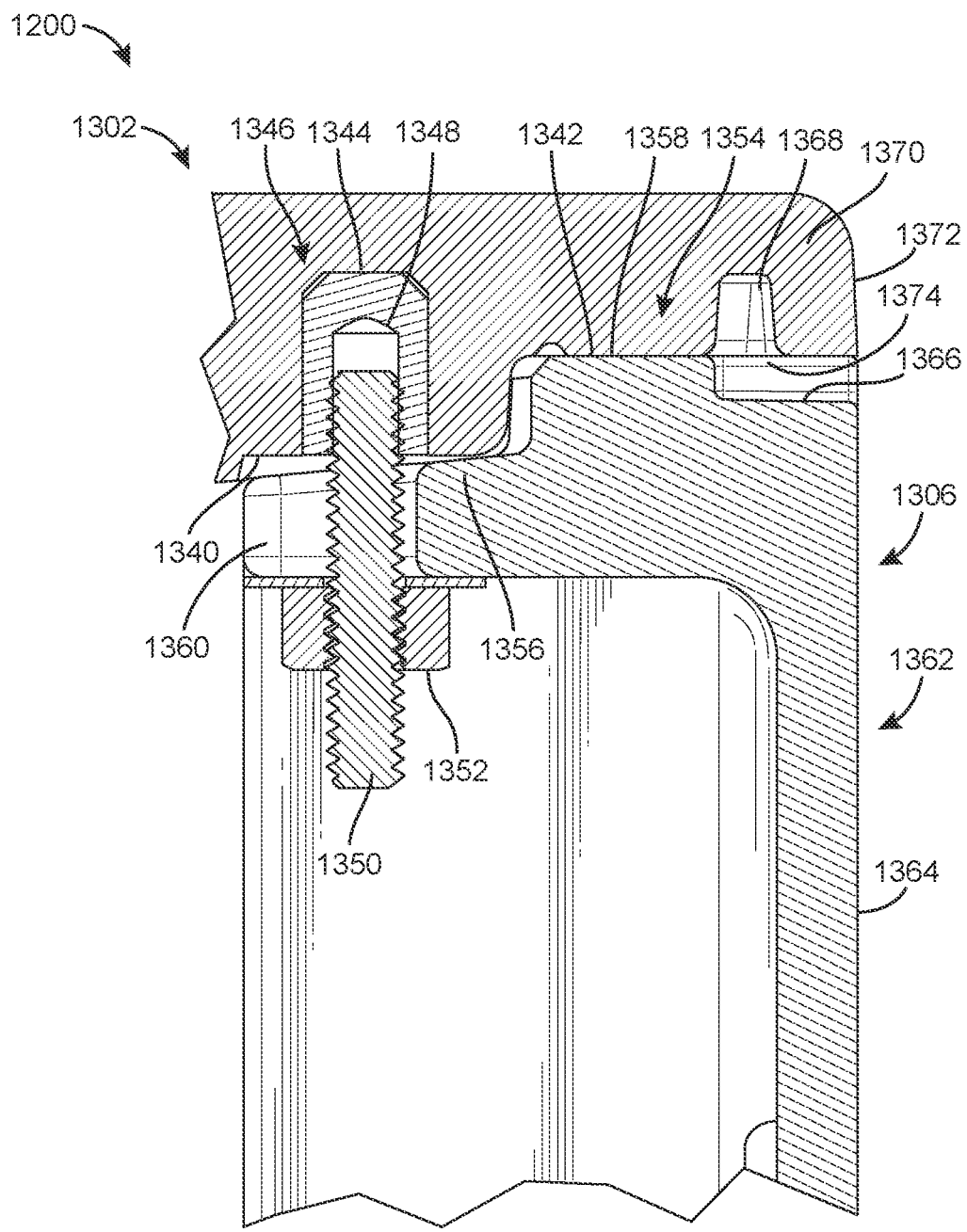
FIG. 15 is a view of Detail C in FIG. 13 taken along plane D-D.

FIGS. 13-15 depict an example sink deck system 1300 (e.g., kitchen sink system, counter sink system, etc.). The sink deck system 1300 is similar to the sink system 100 described herein. However, as is explained in more detail herein, the sink deck system 1300 incorporates a sink deck 1302 (e.g., countertop, etc.) which is coupled to a basin 1304 and an apron 1306 (e.g., skirt, panel, etc.). Unlike in the sink system 100, the basin 1304 is not coupled to the apron 1306. Instead, the sink deck 1302 supports the apron 1306 on the basin 1304. In this way, the sink deck system 1300 can provide the sink deck 1302 for use with the basin 1304 alone (e.g., without the apron 1306, etc.) or in combination with the apron 1306, thereby providing for simple reconfiguration for tailoring the sink deck system 1300 to a variety of target applications (e.g., dual-mount, under-mount, top-mount, etc.). Additionally, the apron 1306 can be rapidly interchanged with another apron 1306, thereby providing additional reconfiguration for tailoring the sink deck system 1300 to a variety of target applications.

The sink deck 1302 is constructed from a first material, the basin 1304 is constructed from a second material, and the apron 1306 is constructed from a third material. In some embodiments, the sink deck 1302 is constructed from a metal (e.g., stainless steel, aluminum, etc.) and the basin 1304 and the apron 1306 are both constructed from the same, or similar, non-metallic materials (e.g., ceramic materials, polymeric materials, synthetic materials, etc.). In some embodiments, the sink deck 1302 is constructed from 0.25 inch thick stainless steel.

In various embodiments, the sink deck system 1300 includes one or more accessories that are configured to augment capabilities of a traditional sink, such that the sink deck system 1300 is more desirable than a traditional sink. The accessories are selectively repositionable within a channel that is defined between a basin of the sink and an apron of the sink. The accessories can be inserted into the channel, repositioned within the channel, and removed from the channel, without the apron being removed from the basin. As a result, the sink deck system 1300 eliminates the need for inelegant attachments to be attached to a sink.

As is explained in more detail herein, the basin 1304 is configured to receive water (e.g., hot water, cold water, potable water, cleaning water, etc.), facilitate use of the water within the basin 1304, and provide the water from the basin 1304. The basin 1304 includes a floor 1308 that includes a drain formed therein. As is explained in more detail herein, the basin 1304 is configured to provide water from a faucet (e.g., kitchen faucet, etc.) to the drain, and the drain is configured to pass water from the basin 1304. The drain is configured to be coupled to (e.g., attached to, joined with, integrally formed with, etc.) a sink drain conduit (e.g., pipe, fitting, disposal, etc.) and to provide water from the basin 1304 to the sink drain conduit.

The basin 1304 also includes a front wall 1310. The front wall 1310 is contiguous with (e.g., connected to, sharing a border with, extending from, etc.) the floor 1308. The basin 1304 also includes a first side wall 1312. The first side wall 1312 is contiguous with the floor 1308 and the front wall 1310. In some embodiments, the front wall 1310 and the first side wall 1312 are approximately (e.g., within 5% of, etc.) orthogonal.

The basin 1304 also includes a rear wall 1314. The rear wall 1314 is contiguous with the floor 1308 and the first side wall 1312. In some embodiments, the front wall 1310 and the rear wall 1314 are approximately parallel.

The basin 1304 also includes a second side wall. The second side wall is contiguous with the floor 1308, the front wall 1310, and the rear wall 1314. In some embodiments, the front wall 1310 and the second side wall are approximately orthogonal. In some embodiments, the rear wall 1314 and the second side wall are approximately orthogonal. In various embodiments, the front wall 1310, the first side wall 1312, the rear wall 1314, and the second side wall generally define a rectangle or a square.

The basin 1304 also includes a basin rim 1316. As is explained in more detail herein, the basin rim 1316 facilitates attachment of the basin 1304 to an apron 1306 and support of the basin 1304 on a counter structure 1318 (e.g., support, beam, chassis, etc.).

The basin rim 1316 includes a rim front side 1320. The rim front side 1320 is contiguous with the front wall 1310 and extends (e.g., projects, protrudes, etc.) from the front wall 1310 away from the rear wall 1314. The rim front side 1320 is not coupled to the apron 1306. In some embodiments, the rim front side 1320 interfaces with the counter structure 1318 (e.g., on a beam of the counter structure 1318, etc.). In various embodiments, the rim front side 1320 is separated from the apron 1306 (e.g., by a gap, by a spacing, etc.).

The basin rim 1316 also includes a rim first side 1322. The rim first side 1322 is contiguous with the first side wall 1312 and the rim front side 1320. The rim first side 1322 extends from the first side wall 1312 away from the second side wall. The rim first side 1322 is not coupled to the apron 1306. In some embodiments, the rim first side 1322 interfaces with the counter structure 1318 (e.g., on a beam of the counter structure 1318, etc.).

The basin rim 1316 also includes a rim rear side 1324. The rim rear side 1324 is contiguous with the rear wall 1314 and the rim first side 1322 and extends from the rear wall 1314 away from the front wall 1310. The rim rear side 1324 is not coupled to the apron 1306. In some embodiments, the rim rear side 1324 interfaces with the counter structure 1318 (e.g., on a beam of the counter structure 1318, etc.).

The basin rim 1316 also includes a rim second side. The rim second side is contiguous with the second side wall, the rim rear side 1324, and the rim front side 1320. The rim second side extends from the second side wall away from the first side wall 1312. The rim second side is not coupled to the apron 1306. In some embodiments, the rim second side interfaces with the counter structure 1318 (e.g., on a beam of the counter structure 1318, etc.).

In some embodiments, at least a portion of the rim front side 1320, at least a portion of the rim first side 1322, at least a portion of the rim rear side 1324, and at least a portion of the rim second side are disposed along the same plane. In this way, the basin rim 1316 may interface with a planar portion of the sink deck 1302 (e.g., such that the planar portion of the sink deck 1302 sits flush on the planar portions of the rim front side 1320, the rim first side 1322, the rim rear side 1324, and the rim second side).

As shown in FIG. 14, the basin rim 1316 includes a plurality of apertures 1326 (e.g., holes, etc.) disposed along the basin rim 1316. As is explained in more detail herein, the apertures 1326 are configured to facilitate coupling of the basin 1304 to the sink deck 1302. For example, the basin rim 1316 may include eight apertures 1326 uniformly distributed along the rim front side 1320, the rim first side 1322, the rim rear side 1324, and the rim second side. Unlike the apertures 136, the apertures 1326 are through-holes. In other words, the apertures 1326 extend entirely through the basin rim 1316.

The sink deck system 1300 also includes a plurality of basin rim inserts 1328 (e.g., plugs, etc.). Each of the apertures 1326 is configured to receive one of the basin rim inserts 1328. For example, each of the basin rim inserts 1328 may be press fit into one of the apertures 1326. In some embodiments, adhesive is placed into the apertures 1326 prior to the basin rim inserts 1328 being inserted into the apertures 1326. In these embodiments, the basin rim inserts 1328 may be coupled to the basin rim 116 via the adhesive and/or a friction fit between the basin rim inserts 1328 and the apertures 1326. In some embodiments, the basin rim inserts 1328 are molded into the apertures 1326. For example, the basin rim inserts 1328 may be molded into the apertures 1326 in a similar process to the assembly process 1200. In some embodiments, the basin rim inserts 1328 are integrally formed with the apertures 1326.

Each of the basin rim inserts 1328 has an aperture 1330 (e.g., hole, etc.). The apertures 1330 are threaded. Each of the apertures 1330 is configured to receive a threaded fastener 1332 (e.g., bolt, etc.). The threaded fasteners 1332 are configured to be coupled to the basin rim 1316 via the apertures 1330 without direct interfacing between the threaded fasteners 1332 and the basin rim 1316. As a result, mechanical stresses and strains on the basin rim 1316 may be minimized.

The sink deck 1302 includes a plurality of apertures 1334 (e.g., holes, etc.) disposed along the sink deck 1302. As is explained in more detail herein, the apertures 1334 are configured to facilitate coupling of the basin 1304 to the sink deck 1302. For example, the sink deck 1302 may include eight apertures 1334 uniformly distributed along the sink deck 1302. The sink deck 1302 may be configured such that the apertures 1334 can be aligned with the apertures 1330. For example, a pattern of the apertures 1334 may match a pattern of the apertures 1330. Unlike the apertures 1326, the apertures 1334 are not through-holes. In other words, apertures 1334 do not extend entirely though the sink deck 1302. As a result, a top surface of the sink deck 1302 (e.g., a surface of the sink deck 1302 that is farthest from the floor 1308, etc.) is uninterrupted across the sink deck 1302. This may increase an aesthetic benefit of the sink deck 1302 and mitigate accumulation of grime on the sink deck 1302, thereby making the sink deck 1302 more desirable than other decks that have through-holes.

The sink deck system 1300 also includes a plurality of sink deck inserts 1336 (e.g., plugs, etc.). Each of the apertures 1334 is configured to receive one of the sink deck inserts 1336. For example, each of the sink deck inserts 1336 may be press fit into one of the apertures 1334. In some embodiments, adhesive is placed into the apertures 1334 prior to the sink deck inserts 1336 being inserted into the apertures 1334. In these embodiments, the sink deck inserts 1336 may be coupled to the sink deck 1302 via the adhesive and/or a friction fit between the sink deck inserts 1336 and the apertures 1334. In some embodiments, the sink deck inserts 1336 are molded into the apertures 1334. For example, the sink deck inserts 1336 may be molded into the apertures 1334 in a similar process to the assembly process 1200. In some embodiments, the sink deck inserts 1336 are integrally formed with the apertures 1334.

Each of the sink deck inserts 1336 has an aperture 1338 (e.g., hole, etc.). The apertures 1338 are threaded. Each of the apertures 1338 is configured to receive the threaded fastener 1332. The threaded fasteners 1332 are configured to be coupled to the sink deck 1302 via the apertures 1334 without direct interfacing between the threaded fasteners 1332 and the sink deck 1302. As a result, mechanical stresses and strains on the sink deck 1302 may be minimized. As is explained in more detail herein, the basin rim inserts 1328, the fasteners 1332, and the sink deck inserts 1336 cooperate to facilitate coupling of the sink deck 1302 to the basin 1304.

To couple the basin 1304 to the sink deck 1302, the basin rim inserts 1328 are inserted into the apertures 1326 and the sink deck inserts 1336 are inserted into the apertures 1334. Next, the threaded fasteners 1332 are threaded into the apertures 1330. The sink deck 1302 is then lowered onto the basin rim 1316 and the apertures 1334 are aligned with the apertures 1326. The threaded fasteners 1332 and then threaded into the apertures 1338 and the sink deck 1302 is tightened onto the basin rim 1316.

As shown in FIG. 15, the sink deck 1302 includes a stepped portion 1340 and a deck shelf 1342. The deck shelf 1342 partially surrounds (e.g., borders, etc.) the stepped portion 1340. The stepped portion 1340 is extended (e.g., protruded, projected, etc.) relative to the deck shelf 1342. In other words, the stepped portion 1340 is disposed along a plane that is separated from a plane along which the deck shelf 1342 is disposed, and the plane along which the stepped portion 1340 is disposed is closer to the floor 1308 than the plane along which the deck shelf 1342 is disposed.

The sink deck 1302 includes a plurality of apertures 1344 (e.g., holes, etc.) disposed in the stepped portion 1340. For example, the sink deck 1302 may include four apertures 1344 uniformly distributed along the stepped portion 1340 (e.g., an adjacent pair of the apertures 1344 are separated from each other by a distance that is the same as a distance separating another adjacent pair of the apertures 1344, etc.). In various embodiments, the apertures 1344 are not through-holes. In other words, the apertures 1344 do not extend entirely though the stepped portion 1340. As a result, a top surface of the sink deck 1302 (e.g., a surface of the sink deck 1302 that is farthest from the floor 1308, etc.) is uninterrupted across the apertures 1344.

The sink deck system 1300 also includes a plurality of apron coupling inserts 1346 (e.g., plugs, etc.). Each of the apertures 1344 is configured to receive one of the apron coupling inserts 1346. For example, each of the apron coupling inserts 1346 may be press fit into one of the apertures 1344. In some embodiments, adhesive is placed into the apertures 1344 prior to the apron coupling inserts 1346 being inserted into the apertures 1344. In these embodiments, the apron coupling inserts 1346 may be coupled to the stepped portion 1340 via the adhesive and/or a friction fit between the apron coupling inserts 1346 and the apertures 1344. In some embodiments, the apron coupling inserts 1346 are molded into the apertures 1344. In some embodiments, the apron coupling inserts 1346 are integrally formed with the apertures 1344.

Each of the apron coupling inserts 1346 has an aperture 1348 (e.g., hole, etc.). The apertures 1348 are threaded. Each of the apertures 1348 is configured to receive a threaded fastener 1350 (e.g., bolt, etc.). The threaded fasteners 1350 are configured to be coupled to the sink deck 1302 via the apertures 1348 without direct interfacing between the threaded fasteners 1350 and the sink deck 1302. As a result, mechanical stresses and strains on the sink deck 1302 may be minimized. Each of the threaded fasteners 1350 is configured to receive a nut 1352. As is explained in more detail herein, the apron coupling inserts 1346, the threaded fasteners 1350, and the nuts 1352 cooperate to facilitate coupling of the apron 1306 to the basin 1304.

The apron 1306 includes an apron coupling wall 1354. As is explained in more detail herein, the apron coupling wall 1354 is configured to facilitate coupling of the apron 1306 to the sink deck 1302. The apron coupling wall 1354 includes an inner recessed portion 1356 and an apron shelf 1358. The apron shelf 1358 partially surrounds the inner recessed portion 1356. The inner recessed portion 1356 is recessed relative to the apron shelf 1358. In other words, the inner recessed portion 1356 is disposed along a plane that is separated from a plane along which the apron shelf 1358 is disposed, and the plane along which the inner recessed portion 1356 is disposed is closer to the floor 1308 than the plane along which the apron shelf 1358 is disposed, when the apron 1306 is coupled to the sink deck 1302 and the sink deck 1302 is coupled to the basin 1304. When the apron 1306 is coupled to the sink deck 1302 and the sink deck 1302 is coupled to the basin 1304, at least a portion of the apron shelf 1358 is separated from the front wall 1310 by the inner recessed portion 1356.

The inner recessed portion 1356 is configured to receive the stepped portion 1340 such that the apron shelf 1358 interfaces with the deck shelf 1342 when the stepped portion 1340 is received within the inner recessed portion 1356. The inner recessed portion 1356 and the stepped portion 1340 may both be chamfered, filleted, drafted, or otherwise shaped such that the inner recessed portion 1356 is guided onto and over the stepped portion 1340 when the apron 1306 is lifted towards the sink deck 1302 and subsequently coupled to the sink deck 1302.

The inner recessed portion 1356 includes a plurality of apron slots 1360 (e.g., elongated holes, slits, etc.). Each of the apron slots 1360 is configured to be aligned with one of the apertures 1344 when the apron 1306 is coupled to the sink deck 1302. Furthermore, each of the apron slots 1360 is configured to receive one of the threaded fasteners 1350.

To couple the apron 1306 to the sink deck 1302, the apron coupling inserts 1346 are first inserted into the apertures 1348. Next, the threaded fasteners 1350 are threaded into the apertures 1348. The apron 1306 is then lifted and the apron slots 1360 are aligned with the threaded fasteners 1350, which are each extending from one of the apertures 1344. The apron 1306 is then translated towards the basin 1304, such that the apron coupling wall 1354 is located underneath and in confronting relation with the sink deck 1302. This causes the stepped portion 1340 to be received within the inner recessed portion 1356, and for the deck shelf 1342 to interface with the apron shelf 1358. As a result, the threaded fasteners 1350 are received within the apron slots 1360. Finally, the nuts 1352 are threaded onto the threaded fasteners 1350 such that the apron coupling wall 1354 is tightened against the sink deck 1302. The apron slots 1360 may facilitate adjustment of the apron 1306 relative to the sink deck 1302 (e.g., tilting of the apron coupling wall 1354 relative to the sink deck 1302, etc.) as the nuts 1352 are being tightened.

In various embodiments, the threaded fasteners 1350 and the nuts 1352 are replaced with push-nut fasteners. Each push-nut fastener includes a base that is received within one of the apertures 1348 and one of the apron slots 1360. The base includes an aperture and at least one moveable portion. Each push-nut fastener also includes a bolt that is configured to be received within the apertures of the bases. As the nut is inserted into the aperture of the base, the nut contacts the moveable portion and causes the moveable portion to be displaced radially outwards, such that the moveable portion protrudes from the base when the nut is inserted into the aperture. By inserting the base into the aperture 1348 and the apron slot 1360, and then inserting the nut into the aperture of the base, the moveable portion can be deflected outwards (e.g., into contact with the aperture 1348 and/or the apron slot 1360) and provide a retention of the nut within the aperture. This retention may be transferred by the nut to the apron 1306, thereby causing the apron 1306 to be retained on the sink deck 1302.

In various embodiments, the sink deck 1302 includes a first end recess and a second end recess. The first end recess and the second end recess are both disposed in the deck shelf 1342. The first end recess is located proximate the rim first side 1322 and the second end recess is located proximate the rim second side. In these embodiments, the apron coupling wall 1354 includes a first end projection and a second end projection. The first end projection and the second end projection are both disposed in the apron shelf 1358. The first end recess is configured to receive the first end projection when the deck shelf 1342 interfaces with the apron shelf 1358. Similarly, the second end recess is configured to receive the second end projection when the deck shelf 1342 interfaces with the apron shelf 1358. When the apron 1306 is not desirably aligned with the sink deck 1302, the first end projection may interface with the deck shelf 1342 and/or the second end projection may interface with the deck shelf 1342. In this way, the first end recess, the second end recess, the first end projection, and the second end projection cooperate to decrease a likelihood of the apron 1306 being coupling to the sink deck 1302 when the apron 1306 is not desirably aligned with the sink deck 1302. In various embodiments, the first end recess and the second end recess are not through-holes. In other words, the first end recess and the second end recess do not extend entirely though the deck shelf 1342. As a result, a top surface of the sink deck 1302 (e.g., a surface of the sink deck 1302 that is farthest from the floor 1308, etc.) is uninterrupted across the sink deck 1302.

In various embodiments, the sink deck 1302 includes a central recess. The central recess is disposed in the deck shelf 1342. The central recess is located proximate a midpoint of the sink deck 1302 (e.g., at an approximately equal distance from the rim first side 1322 and the rim second side, etc.). In these embodiments, the apron coupling wall 1354 includes a central projection. The central projection is disposed in the apron shelf 1358. The central recess is configured to receive the central projection when the deck shelf 1342 interfaces with the apron shelf 1358. When the apron 1306 is not desirably aligned with the sink deck 1302, the central projection may interface with the deck shelf 1342. In this way, the central recess and the central projection cooperate to decrease a likelihood of the apron 1306 being coupling to the sink deck 1302 when the apron 1306 is not desirably aligned with the sink deck 1302. In various embodiments, the central recess is not a through-hole. In other words, the central recess does not extend entirely though the deck shelf 1342. As a result, a top surface of the sink deck 1302 (e.g., a surface of the sink deck 1302 that is farthest from the floor 1308, etc.) is uninterrupted across the central recess.

In some embodiments, the sink deck 1302 includes the first end recess, the second end recess, and the central recess, and the apron coupling wall 1354 includes the first end projection, the second end projection, and the central projection.

The apron 1306 also includes an apron panel wall 1362. The apron panel wall 1362 is contiguous with the apron coupling wall 1354. The apron panel wall 1362 extends from the apron coupling wall 1354 away from the sink deck 1302. The apron panel wall 1362 defines an exterior surface 1364 (e.g., face, etc.) and an interior surface 170 (e.g., face, etc.).

The exterior surface 1364 has a target aesthetic appearance. For example, the exterior surface 1364 may be textured, polished, and/or contain a design or image. In this way, the exterior surface 1364 may provide a desired aesthetic benefit to a room within which the sink deck system 1300 is installed. Advantageously, the sink deck system 1300 is configured such that the apron 1306 having an exterior surface 1364 with a first target aesthetic appearance can be rapidly and easily interchanged with another apron 1306 having an exterior surface 1364 with a second target aesthetic appearance, while utilizing the same sink deck 1302 and the same other components of the sink deck system 1300. Additionally, the sink deck 1302 can remain supported by the counter structure 1318 while the apron 1306 coupled to the sink deck 1302 is uncoupled from the sink deck 1302, and a new apron 1306 is coupled to the sink deck 1302. In this way, a user can rapidly and easily provide a desired aesthetic benefit to a room within which the sink deck system 1300 is installed.

In various embodiments, the apron coupling wall 1354 includes an outer recessed portion 1366. The outer recessed portion 1366 is partially surrounded by the apron shelf 1358. Additionally, the outer recessed portion 1366 is separated from the inner recessed portion 1356 by the apron shelf 1358. In embodiments where the apron coupling wall 1354 includes the central projection, the central projection is disposed on the apron shelf 1358 between the outer recessed portion 1366 and the inner recessed portion 1356.

The outer recessed portion 1366 is recessed relative to the apron shelf 1358. In other words, the outer recessed portion 1366 is disposed along a plane that is separated from a plane along which the apron shelf 1358 is disposed, and the plane along which the outer recessed portion 1366 is disposed is closer to the floor 1308 than the plane along which the apron shelf 1358 is disposed, when the apron 1306 is coupled to the sink deck 1302 and the sink deck 1302 is coupled to the basin 1304. Similarly, the plane along which the outer recessed portion 1366 is disposed is closer to the apron spanning wall 178 than the plane along which the apron shelf 1358 is disposed. The outer recessed portion 1366 is contiguous with the exterior surface 1364.

The deck shelf 1342 includes an attachment recess 1368. The attachment recess 1368 is disposed along a straight line and is configured to be aligned with the outer recessed portion 1366 when the apron 1306 is coupled to the sink deck 1302. In embodiments where the sink deck 1302 includes the central recess, the central recess is disposed on the sink deck 1302 between the attachment recess 1368 and the stepped portion 1340.

The attachment recess 1368 extends through the deck shelf 1342 such that a lip 1370 of the deck shelf 1342 is formed between the attachment recess 1368 and an exterior surface 1372 of the sink deck 1302. The attachment recess 1368 is recessed relative to the deck shelf 1342. In other words, the attachment recess 1368 is disposed along a plane that is separated from a plane along which the deck shelf 1342 is disposed, and the plane along which the attachment recess 1368 is further from the floor 1308 than the plane along which the deck shelf 1342 is disposed.

When the apron 1306 is coupled to the sink deck 1302, the attachment recess 1368 is aligned with the outer recessed portion 1366. Collectively, the attachment recess 1368 and the outer recessed portion 1366 form an apron attachment channel 1374 when the apron 1306 is coupled to the sink deck 1302. The apron attachment channel 1374 is generally L-shaped or includes at least an L-shape.

The sink deck system 1300 may also include the apron attachment 200 as described herein. The apron attachment 200 is configured to be received within the apron attachment channel 1374 such that the apron attachment 200 is secured within the apron attachment channel 1374. The apron attachment 200 is also configured to be removed from the apron attachment channel 1374. Advantageously, the sink deck system 1300 is configured such that the apron attachment 200 can be received within, and removed from, the apron attachment channel 1374 without uncoupling the apron 1306 from the sink deck 1302. As is explained in more detail herein, the apron attachment 200 provides additional functionality to the sink deck system 1300, thereby increasing the desirability of the sink deck system 1300.

The retainer portion 206 and the connector portion 208 are each configured to be received within the apron attachment channel 1374. The connector portion 208 extends from the apron attachment channel 1374 when the retainer portion 206 is received within the apron attachment channel 1374.

The retainer portion 206 is at least partially disposed within the attachment recess 1368 when the apron attachment 200 is secured within the apron attachment channel 1374. As a result, movement of the apron attachment 200 (e.g., towards the exterior surface 1364, away from the exterior surface 1364, etc.) may cause the retainer portion 206 to be biased against the lip 1370 and/or the deck shelf 1342.

Contact between the retainer portion 206 and the lip 1370 may limit or resist movement of the retainer portion 206, and therefore movement of the connector portion 208 and the apron attachment accessory 204 (e.g., relative to the exterior surface 1364, etc.). Similarly, contact between the retainer portion 206 and deck shelf 1342 may limit or resist movement of the retainer portion 206, and therefore movement of the connector portion 208 and the apron attachment accessory 204 (e.g., relative to the exterior surface 1364, etc.).

When the apron attachment 200 is secured within the apron attachment channel 1374, the connector portion 208 extends between the lip 1370 and the outer recessed portion 1366. In various embodiments, the apron attachment channel 1374 is configured such that the apron attachment 200 can be selectively repositioned (e.g., slid, etc.) along the apron attachment channel 1374 (e.g., from a position proximate the first connector wall 176 to a position proximate the second connector wall 180, etc.).

To secure the apron attachment 200 to the apron attachment channel 1374, the retainer portion 206 is first inserted between the lip 1370 and the outer recessed portion 1366. Then, the apron attachment 200 is rotated and the retainer portion 206 is inserted into the attachment recess 1368 and between the lip 1370 and the deck shelf 1342. This insertion of the outer recessed portion 1366 subsequently causes an insertion of the connector portion 208 between the lip 1370 and the outer recessed portion 1366.

VI. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "approximately," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the present disclosure as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. A method of manufacturing a basin using a molding tool operable between an open position and a closed position, the molding tool having a female molding insert, a male molding insert, and an insert jig, the female molding insert and the male molding insert cooperating to define a mold cavity when the molding tool is in the closed position, the female molding insert having an aperture, the insert jig having a sleeve and a cylinder, the cylinder repositionable within the sleeve and having an end with an end face and a pin protruding from the end face, the pin configured to be received within the aperture of the female molding insert, the method comprising:

applying adhesive to the pin;

aligning the pin with an aperture of a basin rim insert;

pressing the basin rim insert towards the end face such that the pin is received within the aperture of the basin rim insert, wherein the adhesive is configured to secure the basin rim insert to the pin;

filling the mold cavity with molding material such that the molding material encapsulates at least a portion of the basin rim insert, the molding material forming the basin within the mold cavity;

placing the molding tool in the open position; and removing the basin from the molding tool after placing the molding tool in the open position, the basin rim insert being at least partially encapsulated by the basin.

2. The method of claim 1, further comprising inserting at least a portion of the basin rim insert through the aperture of the female molding insert prior to filling the mold cavity with the molding material and after pressing the basin rim insert towards the end face;

wherein the molding material bonds to the end face around the basin rim insert as the molding material forms the basin within the mold cavity.

3. The method of claim 2, wherein:

the female molding insert comprises:
 a front wall; and
 a rim front wall that is contiguous with the front wall;

the male molding insert comprises:
 a front wall; and
 a rim front wall that is contiguous with the front wall;

the rim front wall of the female molding insert is in confronting relation with the rim front wall of the male insert when the mold cavity is filled with the molding material;

the front wall of the female molding insert is in confronting relation with the front wall of the male molding insert when the mold cavity is filled with the molding material;

a basin rim of the basin is formed between the rim front wall of the female molding insert and the rim front wall of the male insert when the mold cavity is filled with the molding material, and the aperture of the female molding insert is disposed in the rim front wall of the female molding insert.

4. The method of claim 2, further comprising separating the molding material from the end face around the basin rim insert after filling the mold cavity with the molding material.

5. The method of claim 4, further comprising separating the pin from the basin rim insert after filling the mold cavity with the molding material.

6. The method of claim 4, further comprising repositioning the cylinder within the sleeve and away from the basin rim insert after filling the mold cavity with the molding material;

wherein the molding material is separated from the end face around the basin rim insert as the cylinder is repositioned within the sleeve and away from the basin rim insert.

7. The method of claim 1, wherein the basin rim insert is at least partially encapsulated by the basin within a basin rim of the basin.

8. The method of claim 1, further comprising lowering the cylinder relative to the female molding insert after filling the mold cavity with the molding material;

wherein the lowering the cylinder relative to the female molding insert causes the pin to be removed from the aperture of the basin rim insert.

9. The method of claim 1, wherein the basin rim insert is metallic.

* * * * *